US008838520B2

(12) United States Patent
Laneman et al.

(10) Patent No.: US 8,838,520 B2
(45) Date of Patent: Sep. 16, 2014

(54) SEQUENCE DETECTION METHODS, DEVICES, AND SYSTEMS FOR SPECTRUM SENSING IN DYNAMIC SPECTRUM ACCESS NETWORKS

(75) Inventors: J. Nicholas Laneman, Granger, IN (US); Zhanwei Sun, South Bend, IN (US); Glenn Bradford, Notre Dame, IN (US)

(73) Assignee: University of Notre Dame du lac, Notre Dame, IN (US)

( * ) Notice: Subject to any disclaimer, the term of this patent is extended or adjusted under 35 U.S.C. 154(b) by 424 days.

(21) Appl. No.: 13/080,607

(22) Filed: Apr. 5, 2011

(65) Prior Publication Data
US 2011/0246411 A1  Oct. 6, 2011

Related U.S. Application Data

(60) Provisional application No. 61/341,882, filed on Apr. 6, 2010.

(51) Int. Cl.
*G06N 5/02*  (2006.01)
*G06N 5/04*  (2006.01)

(52) U.S. Cl.
CPC .......................................... *G06N 5/04* (2013.01)
USPC .......................................................... 706/52

(58) Field of Classification Search
None
See application file for complete search history.

(56) References Cited

U.S. PATENT DOCUMENTS

| | | | |
|---|---|---|---|
| 6,973,615 B1 | 12/2005 | Arad et al. | |
| 7,289,972 B2 | 10/2007 | Rieser et al. | |
| 7,299,042 B2 | 11/2007 | Moore et al. | |
| 7,706,465 B2 | 4/2010 | Gorday et al. | |
| 7,738,890 B1 | 6/2010 | Shull | |
| 7,743,121 B2 | 6/2010 | Boscovic et al. | |
| 7,768,252 B2 | 8/2010 | Park et al. | |
| 7,787,426 B2 | 8/2010 | Seidel et al. | |
| 7,797,263 B2 | 9/2010 | Backof, Jr. et al. | |
| 7,813,318 B2 | 10/2010 | Hu | |
| 2007/0213046 A1* | 9/2007 | Li et al. ........................ | 455/425 |
| 2008/0102849 A1 | 5/2008 | Neel et al. | |
| 2008/0160927 A1 | 7/2008 | Bar-Ness et al. | |
| 2009/0052594 A1 | 2/2009 | Li et al. | |
| 2009/0207735 A1 | 8/2009 | Ben Letaief et al. | |
| 2010/0003922 A1 | 1/2010 | Zhou et al. | |
| 2010/0014616 A1 | 1/2010 | Coulson | |
| 2010/0119016 A1 | 5/2010 | Ghosh | |

(Continued)

OTHER PUBLICATIONS

Park, Kim, Lim, Song, "HMM Based Channel Status Predictor for Cognitive Radio", IEEE, Proceedings of the Asia-Pacific Microwave Conference 2007, APMC 2007, Dec. 2007, pp. 1-4.*

(Continued)

*Primary Examiner* — Kakali Chaki
*Assistant Examiner* — Walter Hanchak
(74) *Attorney, Agent, or Firm* — Knobbe, Martens, Olson & Bear, LLP

(57) ABSTRACT

In one embodiment, a cognitive radio dynamic spectrum access sensing system is configured to incorporate a hidden Markov model and a risk function to determine the primary user state sequence with the minimum amount of associated risk. The system comprises one or more weighted cost factors that can be used to handle a missed detection sensing error differently from a false alarm sensing error. The system further comprises a complete forward partial backward computation designed to increase sensing accuracy with limited effect on sensing delay and complexity.

28 Claims, 11 Drawing Sheets

(56) References Cited

U.S. PATENT DOCUMENTS

| | | | |
|---|---|---|---|
| 2010/0232380 A1 | 9/2010 | Choi et al. | |
| 2010/0240407 A1* | 9/2010 | Park et al. | 455/512 |
| 2011/0191281 A1* | 8/2011 | Park et al. | 706/52 |

OTHER PUBLICATIONS

Melin, "Automatic Speaker Verification on Site and by Telephone: methods, applicaitons and assessment", phd Thesis by KTH Royal Institute of Technology, Stockholm, SE, Dec. 2006, pp. 1-332.*

Akan, Karli, Ergul, "Cognitive Radio Sensor Networks", Network IEEE, vol. 23, No. 4, Jul. Aug. 2009, pp. 34-40.*

Neel, "Analysis and Design of Congitive Radio Networks and Distributed Radio Resource Management Algorithms", phd thesis from Virginia Polytechnic Istitute and State University, Blacksburg, VA, Sep. 2006, pp. 1-368.*

Akbar, I. "Dynamic Spectrum Allocation in Cognitive Radio Using Markov Models," SDR, (2009).

Akyildiz, et al. "Next Generation/Dynamic Spectrum Access/Cognitive Radio Wireless Networks: A Survey," Elsevier Computer Networks, vol. 50, pp. 2127-2159, (2006).

Arslan, H. Cognitive Radio, Software Defined Radio, and Adaptive Wireless Systems, Springer (2007).

Basic GNU Radio. http://radioware.nd.edu/documentation/ acquired on Jun. 10, 2011.

Bradford, Glenn, movie title "Dyspan," http://www.nd.edu/~gbradfor/dyspan_hi.mp4 , Apr. 12, 2010.

Brushe, et al. "A Soft Output Hybrid Algorithm for ML/MAP Sequence Estimation," IEEE Transactions on Information Theory, vol. 44, No. 7, pp. 3129-3134, Nov. 1998.

Cabric, et al. "Implementation Issues in Spectrum Sensing for Cognitive Radios," Proc. Asilomar Conf. Signals, Systems, and Computers, pp. 772-776, Nov. 2004.

Cabric, et al. "Spectrum Sensing Measurements of Pilot, Energy and Collaborative Detection," Proc. of IEEE Military Communications Conference, Oct. 2006.

Chang, et al. "Optimal Channel Probing and Transmission Scheduling for Opportunistic Spectrum Access," IEEE/ACM Transactions on Networking, vol. 17, No. 6, Dec. 2009.

Chen, Z. and Qiu, R. "Prediction of Channel State for Cognitive Radio Using Higher-Order Hidden Markov Model," IEEE, Mar. 2010.

Chen, S. and Tong, L. "Multiuser Cognitive Access of Continuous Time Markov Channels: Maximum Throughput and Effective Bandwidth Regions," ITA, Jan.-Feb. 2010, pp. 1-10.

Chen, et al. "Quickest Spectrum Detection Using Hidden Markov Model for Cognitive Radio," MILCOM, (2009).

De, P. "New Methods for sensing bandlimited signals in Cognitive Radio," IEEE Vehicular Technology Conference, pp. 1916-1920, (2007).

Digham, et al. "On the energy detection of unkown signals over fading channels," in Proc. IEEE Int. Conf. Commun., vol. 5, pp. 3575-3579, May 2003.

"Dynamic programming." Acquired from Wikipedia.org on Jan. 3, 2011.

Ettus USRP. http://www.ettus.com/ acquired on Jun. 10, 2011.

Forney, G. D. "The Viterbi algorithm," Proceedings of the IEEE, vol. 61, pp. 268-278, Mar. 1973.

"Forward-backward algorithm." Acquired from Wikipedia.org on Jan. 3, 2011.

Ganesan, et al. "Cooperative spectrum sensing in cognitive radio, part I: Two user networks," IEEE Trans. Wireless Commun., pp. 2204-2213, Jun. 2007.

Gardner, W.A. "Measurement of Spectral Correlation," IEEE Trans. Acoust., Speech, Signal Processing, pp. 1111-1123, vol. 34, Oct. 1986.

Ge, F. "Software Radio-Based Decentralized Dynamic Spectrum Access Networks: A Prototype Design and Enabling Technologies," (2009).

Geirhofer, et al. "Dynamic Spectrum Access in WLAN Channels: Empirical Model and Its Stochastic Analysis," TAPAS, (2006).

Ghasemi, et al. "Spectrum Sensing in Cognitive Radio Networks: Requirements, Challenges and Design Trade-Offs," IEEE Communications Magazine, Apr. 2008.

Ghosh, C. "Innovative Approaches to Spectrum Selection, Sensing, and Sharing in Cognitive Radio Networks," Apr. 2009.

Ghosh, et al. "Markov Chain Existence and Hidden Markov Models in Spectrum Sensing," IEEE, pp. 1-6, (2009).

Gnu Radio, http://gnuradio.org/trac/wiki. acquired on Jun. 10, 2011.

Haykin, S. "Cognitive radio: brain-empowered wireless communications," IEEE J. Select. Areas Commun., vol. 23, Feb. 2005.

He, et al. "Signal Classification based on Cyclostationary Spectral Analysis and HMM/SVM in Cognitive Radio," IEEE pp. 309-312, (2009).

"Hidden Markov model." Acquired from Wikipedia.org on Jan. 3, 2011.

Huang, et al. "Optimal Sensing-Transmission Structure for Dynamic Spectrum Access," IEEE Info Com, (2009).

Huang, et al. "Optimal Transmission Strategies for Dynamic Spectrum Access in Cognitive Radio Networks," IEEE Transactions on Mobile Computing, vol. 8, No. 12, Dec. 2009.

Huang, et al. "Optimization of Transmission Strategies for Opportunistic Access in Cognitive Radio Networks," IEEE pp. 1-12, (2009).

Isomäki, et al. "An Overview of Software Define Radio Technologies," TUCS Technical Report No. 652, Dec. 2004.

Kim, H. and Shin, K. "Efficient Discovery of Spectrum Opportunities with MAC-Layer Sensing in Cognitive Radio Networks, IEEE Transactions on Mobile Computing," vol. 7, No. 5, pp. 533-545, May 2008.

Li, et al. "Optimal Cognitive Access of Markovian Channels under Tight Collision Constraints," IEEE, May 23, 2010.

Liang, et al. "Sensing-Throughout Tradeoff for Cognitive Radio Networks," IEEE Trans. Wireless Commun., vol. 7, No. 4, pp. 1326-1337, Apr. 2008.

Ma, et al. "Soft Combination and Detection for Cooperative Spectrum Sensing in Cognitive Radio Networks," IEEE GlobeCom, pp. 3139-3143 Dec. 2007.

"Marginal distribution." Acquired from Wikipedia.org on Jan. 3, 2011.

Min, et al. "Interference Avoidance Based on Multi-step-ahead Prediction for Cognitive Radio," IEEE pp. 227-231, (2008).

Mishra, et al. "Cooperative sensing among cognitive radios," IEEE International Conference on Communications, vol. 4, pp. 1658-1663, (2006).

Mitola, J. "Cognitive radio for flexible mobile multimedia communications," Proc. IEEE Int. Workshop Mobile Multimedia Communications, pp. 3-10, (1999).

Park, et al. "HMM Based Channel Status Predictor for Cognitive Radio," IEEE, (2007).

"Posterior probability." Acquired from Wikipedia.org on Jan. 3, 2011.

Rabiner, L. R. "A Tutorial on Hidden Markov Models and Selected Applications in Speech Recognition," Proceedings of the IEEE, vol. 77, pp. 257-286, Feb. 1989.

Sahai, et al. "Some Fundamental Limits on Cognitive Radio," Proc. of Allerton Conference, Oct. 2004.

Samani, R. "Spectrum Sensing Algorithms for Cognitive Radio Applications," pp. 1-12, 2009, downloaded from Isfahan University on Jan. 13, 2011.

Sun, et al. "Cooperative Spectrum Sensing for Cognitive Radios under Bandwidth Constraints," IEEE Wireless Communications and Networking Conference, pp. 1-5, (2007).

Sun, Z. "Design and Implementation of Sequence Detection Algorithms for Dynamic Spectrum Access Networks," Apr. 2010.

Sun, et al. "Sequence Detection Algorithms for Dynamic Spectrum Access Networks," IEEE, Apr. 2010.

Sun, et al. "Sequence Detection Algorithms for Dynamic Spectrum Access Networks," Powerpoint Presentation created on Apr. 1, 2010 and presented on Apr. 8, 2010.

Sutton, et al. "Cyclostationary Signature Detection in Multipath Rayleigh Fading Environments," IEEE CrownCom, pp. 408-413, (2007).

(56) References Cited

OTHER PUBLICATIONS

Tumuluru, et al. "Channel status prediction for cognitive radio networks," Wirel. Commun. Mob. Comput., Aug. 4, 2010, 10:1-13, published online in Wiley InterScience.

Van Trees, H. L. Detection and Estimation Theory, J. Wiley & Sous Inc., (1968).

"Viterbi algorithm." Acquired from Wikipedia.org on Jan. 3, 2011.

Wang, et al. "Extended Knowledge-Based Reasoning Approach to Spectrum Sensing for Cognitive Radio," IEEE Transactions on Mobile Computing, vol. 9, Aug. 21 2009.

Wellens, et al. "Evaluation of Adaptive MAC-Layer Sensing in Realisitc Spectrum Occupancy Scenarios," IEEE, Apr. 6, 2010.

Wyatt, et al. "Conversion Detection and Speaker Segmentation in Privacy-Sensitive Situated Speech Data," Interspeech (2007).

Zeng, et al. "Eigenvalue based Spectrum Sensing Algorithms for Cognitive Radio," IEEE Transactions on Communications, vol. 57, pp. 1784-1793, (2009).

Zhao, et al. "A Survey of Dynamic Spectrum Access: Signal Processing, Networking, and Regulatory Policy," , IEEE Sig. Processing, May 2007.

Zhao, et al. "Decentralized Cognitive MAC for Dynamic Spectrum Access," Proc. IEEE Int'l Symp. Dynamic Spectrum Access Networks, pp. 224-232, Nov. 2005.

Zhao, et al. "Opportunistic Spectrum Access via Periodic Channel Sensing," IEEE, (2008), 56:785-796.

International Search Report and Written Opinion issued in PCT/US2011/031295, mailed Jun. 14, 2011.

\* cited by examiner

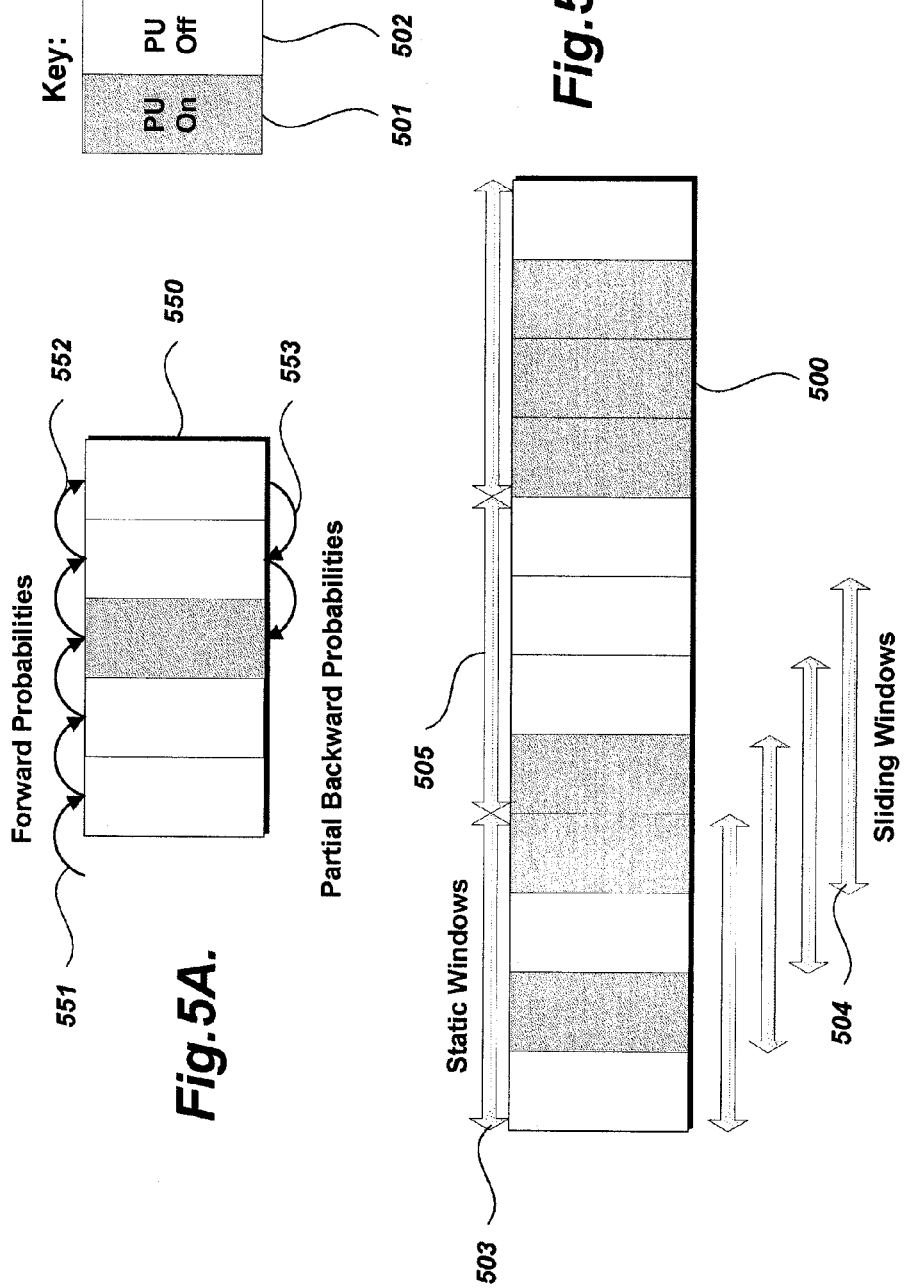

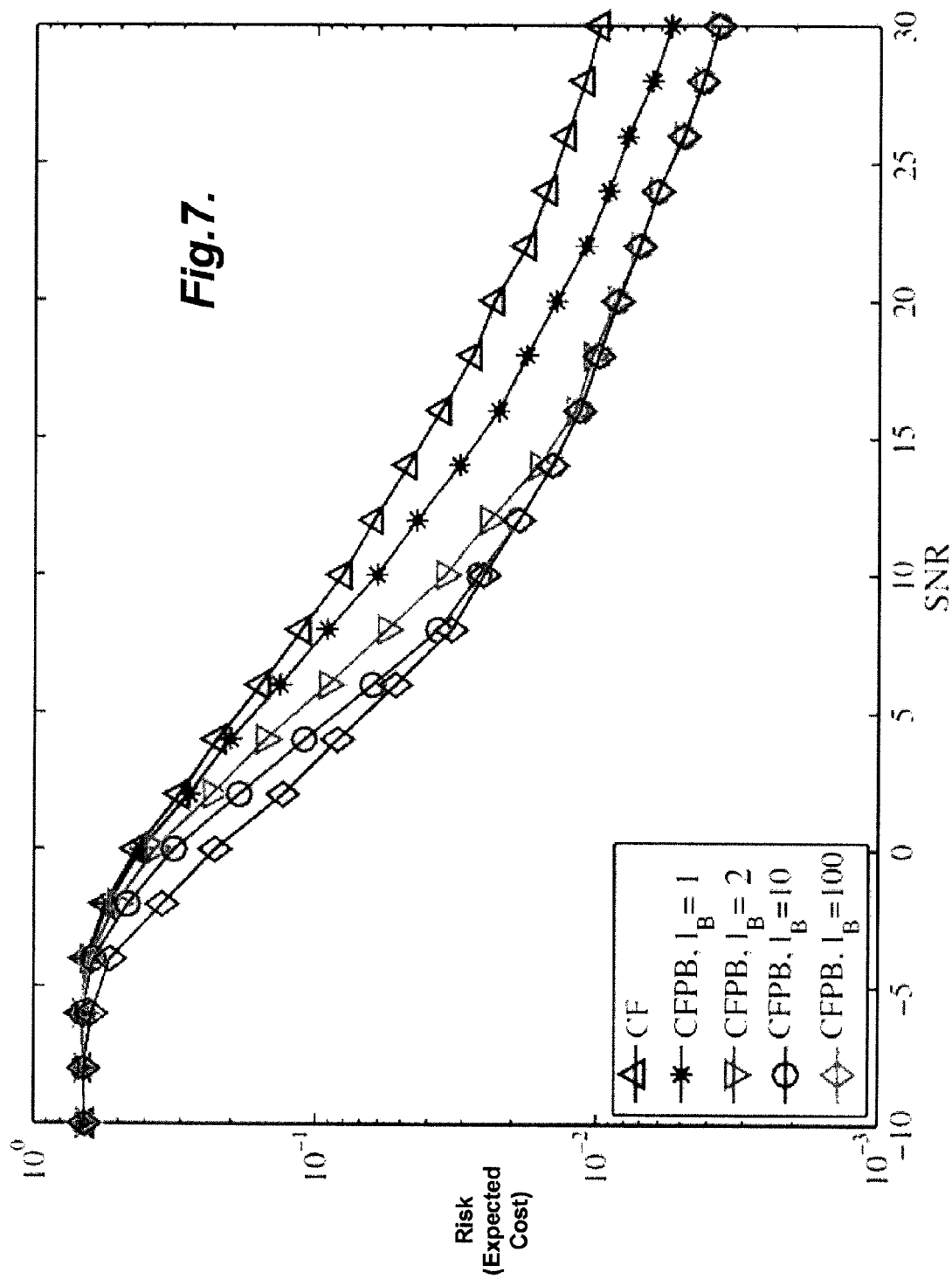

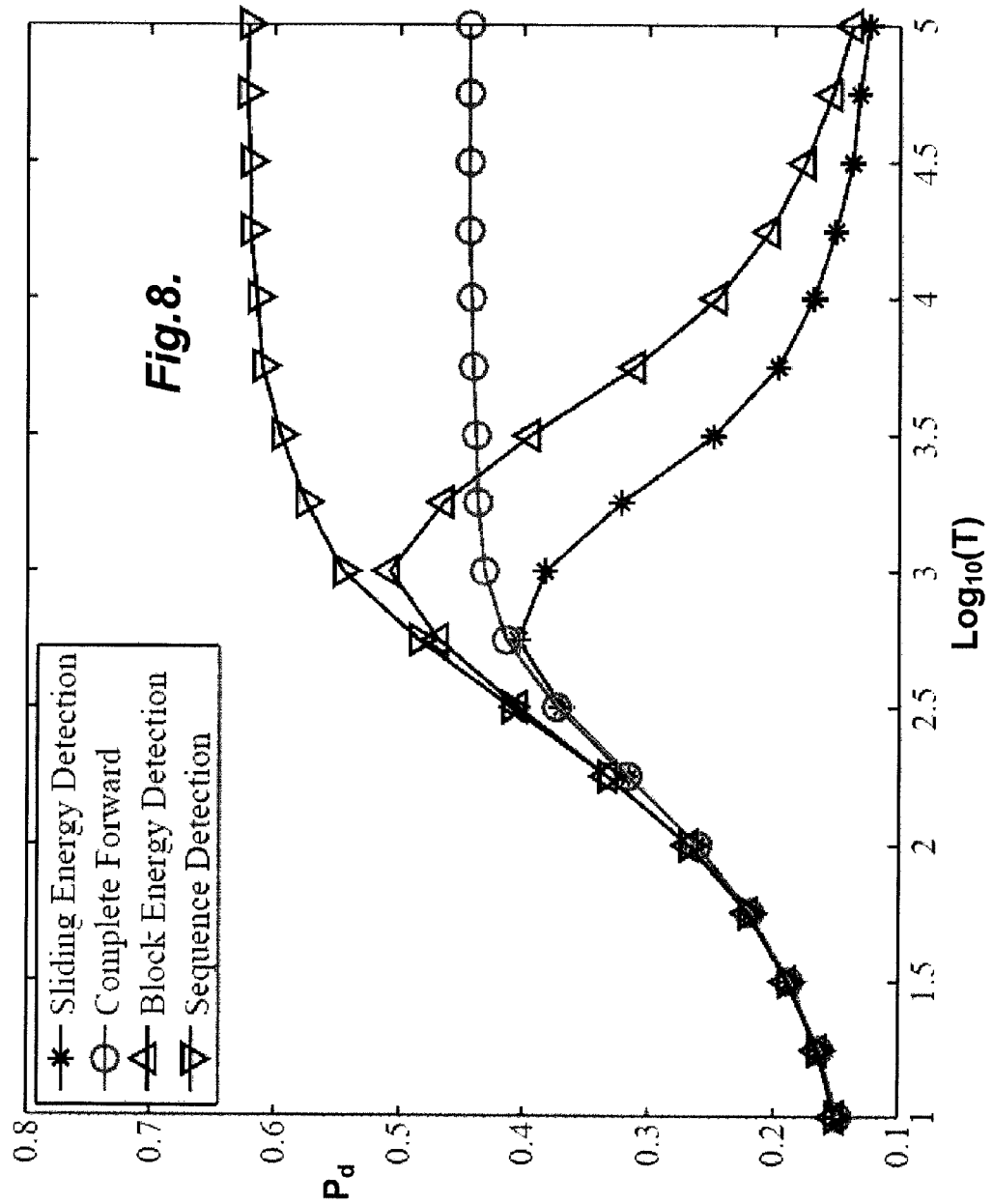

SEQUENCE DETECTION METHODS, DEVICES, AND SYSTEMS FOR SPECTRUM SENSING IN DYNAMIC SPECTRUM ACCESS NETWORKS

CROSS-REFERENCE TO RELATED APPLICATIONS

The present application claims benefit under 35 U.S.C. 119(c) to U.S. Provisional Application No. 61/341,882, filed Apr. 6, 2010, which is hereby incorporated by reference in its entirety, including specifically but not limited to systems and methods relating to sequence detection for dynamic spectrum access.

BACKGROUND

1. Field

Embodiments of the disclosure generally relate to the field of dynamic spectrum access in wireless networks, and in particular, to systems, methods, and devices for primary user sequence detection.

2. Description of the Related Art

Cognitive radio is any radio that may change its transmission behavior based on interaction within the radio environment which it operates. Cognitive radios may perform dynamic spectrum access, which is a method of communication between nodes in a wireless network that takes advantage of inefficient use of already used or licensed radio spectrum. It is well known in the art that total throughput of information transmitted in a radio spectrum can be increased by allowing certain cognitive radio wireless nodes or secondary radio users to transmit when the traditional or primary radio users of the spectrum are idle. Transmission performed in this manner allows multiple wireless radio networks to use the same radio spectrum, thus increasing the exchange of information, while reducing interference to the traditional radio users' use of the spectrum thru "smart" transmission.

Determining when primary radio users are idle and not transmitting in a radio spectrum is called spectrum sensing. One approach is the detection of a pilot signal that is transmitted simultaneously with the traditional user's data. When the pilot signal is detected, the cognitive radio cannot transmit.

Another approach for spectrum sensing is called energy detection. Energy detection is based on the assumption that all radio transmissions, including the primary users' transmissions, have inherent associated energy. The energy can be measured at different radio frequencies across a radio spectrum. After removing the energy associated with out of band noise, an energy detector compares these energy levels to minimum energy level thresholds to determine whether there is enough energy in the primary radio users' spectrum to make the determination that it is the primary radio users' current transmissions that is the cause of the energy. If the energy meets these thresholds or a subset of thresholds, the spectrum is considered occupied by the primary users. However, if the energy thresholds are not met, then the primary users are considered idle and the channel is free. A cognitive radio user can then access the spectrum.

SUMMARY OF THE DISCLOSURE

In some embodiments, the sequence detection sensing system is configured to collect observations of primary user transmission time periods using an antenna, and may correspond to the primary user transmission state of ON or OFF during each time period. The antenna may receive primary user transmissions in one or more frequency bands. The system may collect these observations into overlapping or non-overlapping window data structures stored in one or more data storage devices. The system may take as input the observation window and primary spectrum use parameters which indicate a probabilistic pattern of behavior for the primary user. The primary spectrum use parameters may also be stored in the one or more data storage devices. One or more processors may be configured to execute modules, including a sensing module.

A sensing module may determine, assess, calculate, predict, estimate, and/or generate a sensing decision and/or sensing decision related information. The sensing module may take advantage of the probabilistic relationships between observations in a hidden Markov model. In some embodiments, it uses these relationships, determined from the primary user spectrum use parameters, by computing forward and backward probabilities of each potential state during the observation window time periods. Based on the forward and backward probabilities, posterior probabilities for each potential state observation may be calculated.

In some embodiments, the sensing module uses the posterior probabilities to perform a risk analysis that produces a primary user state estimate. The risk analysis takes into account a weighted cost of missed detection errors and false alarm errors created by interference in the monitored frequency bands. A missed detection occurs if the primary user transmits but the secondary user fails to detect the transmission. A false alarm occurs if the secondary user determines the primary user is transmitting, when in actuality the primary user is not transmitting. The system reduces these sensing errors by assigning each error a cost according to a policy implemented through weighted cost values. The weighted cost value of each error is multiplied by the posterior probability of that error occurring given a potential primary user state (ON or OFF) during a collected observation time period. The multiplied cost-probability values for each error may be summed together to create a risk value for the proposed potential state. The ON or OFF state with the least amount of associated risk, i.e. the minimum risk state, may be selected. This process may be performed for each state in the observation window, creating a sequence of minimum risk states. A state, a sequence of states, risk information, and/or probability information may then be returned as a primary user state estimate to a sensing decision consumer where a transmission decision may be made. The system can then use the sensing estimate to make a transmission decision based on primary user behavior, creating a reduction in interference to a primary user that was created by the secondary user, and increasing the throughput of secondary user transmission by more accurately sensing the primary user.

In some embodiments, the sensing module may use a complete forward only implementation. A complete forward only implementation may keep a running summary of all forward probabilities. This implementation may use the running summary to perform the risk analysis for only one observation time period, and need not calculate backward or posterior probabilities. Although accuracy is reduced compared to using some other implementations disclosed herein, the complete forward only implementation also reduces delay, computation time, and complexity of the sensing system.

In some embodiments, the sensing module may use a complete forward partial back implementation. A complete forward partial back implementation may use in addition to the forward observations, calculated backward probabilities and corresponding posterior probabilities for only a subset of observations. By doing so, it further exploits the hidden Markov model's memory compared to the complete forward implementation and increases accuracy of sensing estimates, with only modest increases in sensing delay, computation time, and complexity under certain circumstances.

In some embodiments, a computer implemented method provides spectrum sensing. The method can include accessing computer-executable instructions from at least one computer-readable storage medium and executing the computer-executable instructions, thereby causing computer hardware comprising at least one computer processor to perform operations. The operations can comprise, receiving one or more primary user spectrum use parameters, receiving a primary user state observation data set corresponding to a frequency spectrum, receiving one or more cost factors, determining one or more forward state probabilities based on the one or more primary user spectrum use parameters and a first subset of the primary user state observation data set corresponding to the frequency spectrum, determining one or more partial backward state probabilities based on the one or more primary user spectrum use parameters and a second subset of the primary user state observation data set corresponding to the frequency spectrum, determining one or more posterior state probabilities for one or more observations in the primary user state observation data set, determining a risk of a sensing error for each potential primary user state corresponding to an observation period about which a sensing decision is being made based on one or more cost factors and the one or more posterior state probabilities, selecting a potential primary user state having a minimum amount of risk of sensing error for each observation corresponding to a time period about which a sensing decision is being made, and/or sending the one or more selected potential primary user states to a sensing decision consumer.

In some embodiments, a storage medium has a computer program stored thereon for causing a suitably programmed system to process computer-program code by performing a method for spectrum sensing when the computer program is executed on the suitably programmed system. The method can comprise receiving one or more primary user spectrum use parameters, receiving a primary user state observation data set corresponding to a frequency spectrum, receiving one or more cost factors, determining one or more forward state probabilities based on the one or more primary user spectrum use parameters and a first subset of the primary user state observation data set corresponding to the frequency spectrum, determining one or more partial backward state probabilities based on the one or more primary user spectrum use parameters and a second subset of the primary user state observation data set corresponding to the frequency spectrum, determining one or more posterior state probabilities for one or more observations in the primary user state observation data set, determining a risk of a sensing error for each potential primary user state corresponding to an observation period about which a sensing decision is being made based on one or more cost factors and the one or more posterior state probabilities, selecting a potential primary user state having a minimum amount of risk of sensing error for each observation corresponding to a time period about which a sensing decision is being made, and/or sending the one or more selected potential primary user states to a sensing decision consumer.

In some embodiments, the sensing system may comprise an antenna, one or more data storage devices, and one or more processors. Stored on the data storage devices is a first parameter vector representing the primary user state observation data, a second parameter vector representing decision weights or cost parameters, and a state observation data set. The processors are configured to determine two sets of quantities from the observation data set by using the first parameter vector, and to determine a primary user state estimate from the two sets of quantities and the second parameter vector. The system sends the primary user estimate to the sensing decision consumer.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the embodiments of the invention are described in detail below with reference to the drawings of various embodiments, which are intended to illustrate and not to limit the invention. The drawings comprise the following figures in which:

FIG. 5A is a diagram illustrating part of one embodiment for computing forward and partial backward probabilities.

FIG. 5B is a diagram illustrating overlapping and non-overlapping sensing windows.

FIG. 7 is a graph illustrating some embodiments expected cost given a signal to noise ratio.

FIG. 8 is a graph illustrating comparative performance with various sensing windows versus the probability of detection.

DESCRIPTION OF THE EMBODIMENTS

Figure 1:
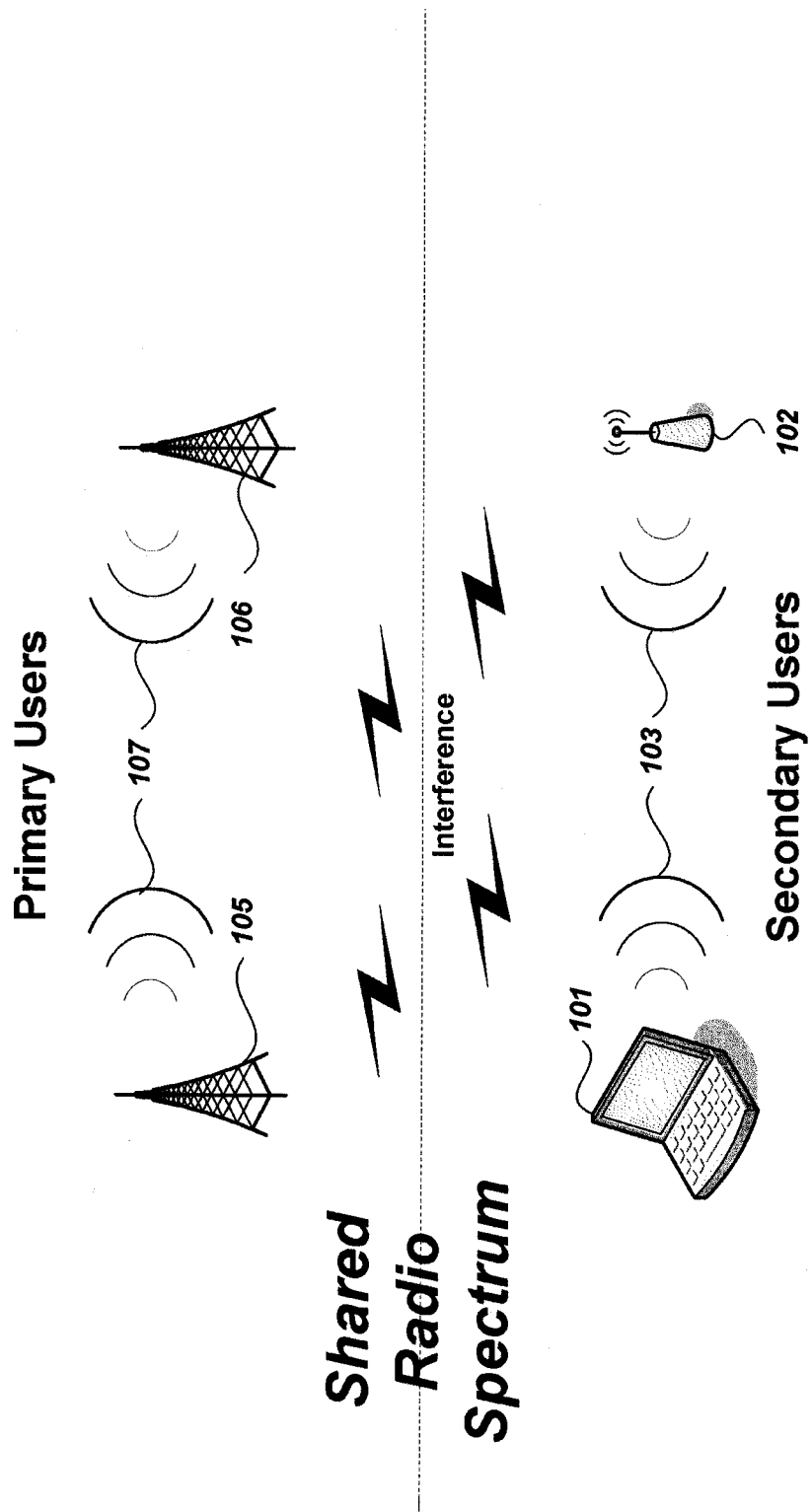
FIG. 1 is a diagram illustrating the relationship between the primary users of a radio spectrum and the secondary users of a radio spectrum.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

Details regarding several illustrative preferred embodiments for implementing the system and method described herein are described below with reference to the figures. At times, features of certain embodiments are described below in accordance with that which will be understood or appreciated by a person of ordinary skill in the art to which the system and method described herein pertain. For conciseness and readability, such a "person of ordinary skill in the art" is often referred to as a "skilled artisan."

As a skilled artisan would generally recognize, new radio spectrum is hard to obtain. The Federal Communications Commission (FCC) regulates who is allowed to transmit based on five radio dimensions—three dimensional space, time, and frequency—by assigning frequencies, areas, and times to licensed transmitters. Currently there are few of these "spectrum opportunities" left to be assigned by the FCC. Most frequencies and geographic regions are already licensed. However, many already licensed spectrums could be reused to increase the efficiency of spectrum utilization, and thus open it up for more licensed users. The FCC has indicated that cognitive radio in particular "has the potential to significantly increase the efficiency of spectrum utilization by enabling radios to access and share available spectrum dynamically across different frequencies, thus making more productive use of this valuable resource for the benefit of all consumers." One way to increase spectrum utilization is to allow a secondary user to use an already assigned radio spectrum when the primary user is not using the spectrum. However, it can be difficult to determine when the primary user is using or not using the spectrum, and difficult to predict how long any primary user's use or non-use will last.

To help solve these difficulties and increase the efficiency of spectrum utilization, this disclosure illustrates sensing methods and systems with a number of advantages. These advantages include, but are not limited to, reducing interference to primary and secondary users, increasing the accuracy of determining when the primary user is or is not using the spectrum, allowing for implementation of sensing error policy goals, and providing for tradeoffs to occur between sensing accuracy and sensing efficiency.

A secondary user's transmission in a primary user's radio spectrum may create interference with the primary user's transmission, and thus inhibit the primary user's ability to communicate with any of its listeners. To reduce interference and its negative effects on the primary user, the disclosure herein describes how to increase sensing accuracy by taking advantage of the memory in a hidden Markov model that tracks primary user state. The system exploits this memory by analyzing transmission observation sequences rather than analyzing a single observation state, and can make it possible to increase efficiency of spectrum utilization, while at the same time decreasing the odds that the secondary user's transmission will occur at the same time as the primary user's transmission and create interference.

The systems and methods disclosed herein also allow for the implementation of sensing error policy goals that treat missed detection sensing errors differently from false alarm sensing errors. The disclosure demonstrates how it can be important in certain circumstances to treat a missed detection sensing error differently from a false alarm sensing error because, unlike false alarms, only missed detections create interference with the primary user. Disclosed herein is an embodiment of a risk analysis that implements a sensing error policy and/or can provide different risk costs to a missed detection and a false alarm. It is advantageous to provide a method of adjusting sensing error policy because entities that can control secondary user behavior, such as wireless network administrators, equipment manufacturers, standards bodies, and the government, may wish to be more or less conservative with a missed detection error's affect on a primary user's transmissions given different times, frequencies, and locations.

Furthermore, the disclosure describes how to trade off sensing accuracy for increased sensing performance. Great accuracy can be achieved by taking into account forward and backward probabilities when making a sensing decision. However, nearly as large increases in accuracy can also occur under certain circumstances by taking into account only a small set of backwards possibilities, while at the same time reducing sensing delay and complexity. By reducing sensing delay and complexity, the secondary user can make a sensing decision more quickly and begin its own transmission sooner after a primary user stops transmitting, resulting in an increase in secondary user use of the spectrum.

It will be apparent to a skilled artisan, in light of this disclosure, that the system and method described herein can advantageously be implemented using software, hardware, firmware, or any combination of software, hardware, and firmware. In some embodiments, the system is implemented as a number of software modules that comprise computer executable code for performing the functions described herein. In some embodiments, the computer-executable code is executed on one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

It will also be apparent to a skilled artisan, in light of this disclosure, that the modules described herein can be combined or divided. For example, a skilled artisan will appreciate, in light of this disclosure, that any two or more modules or components can be combined into one module or component. Thus, referring to FIG. 2A, the wireless access module 230 and the I/O devices and interfaces module 210 may be combined into a single module that performs all or part of the functions of both modules. Conversely, any one module can be divided into multiple modules. For example, the wireless access module 230 can be divided into multiple modules such that each individual module performs part the functions of the wireless access module 230 and all of the modules collectively perform all such functions.

In general the word "module," as used herein, refers to logic embodied in hardware or firmware or to a collection of software instructions, having entry and exit points. Software modules are written in a program language, such as JAVA, C or C++, or the like. Lower level languages, such as processor specific instructions in assembly or machine language may also be used. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules may be executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

Cognitive Radio and Dynamic Spectrum Access

FIG. 1 is a diagram illustrating the relationship between the primary users of a radio spectrum and the secondary users of a radio spectrum. Primary users 105 and 106 of a radio spectrum are usually licensed users of a radio spectrum, such as the spectrums-regulated by the Federal Communications Commission (FCC). Examples of currently regulated spectrum include, but are not limited to, AM/FM radio and television broadcast spectrums. Many primary users do not take into account whether other users of the same spectrum are transmitting before making a decision to transmit. Instead, these types of primary users carry on with transmission of information on various radio spectrums without regard to any other type of users. However, primary users frequently do not constantly transmit on all channels of their regulated radio spectrum either. Thus, there is some idle time when a primary user is not transmitting.

Because of this idle time, it is possible for another set of users to access the licensed radio spectrum when a primary user is not doing so. Secondary users 101 and 102, otherwise known as cognitive radios that perform dynamic spectrum access, may transmit using the same radio spectrum as the primary user for their own purposes. For example, secondary user 101 may be a laptop computer that is wirelessly communicating with a network access point 102. These secondary users may only transmit wirelessly during primary user idle times, otherwise the secondary users' transmission will interfere with the primary user's signal.

Thus, it is advantageous that a secondary user detect, or have a third party detect, when the primary user is transmitting, also known as being in the ON state, and when the primary user is not transmitting, also known as being in the OFF state. This detection is often referred to by a skilled artisan as spectrum sensing. The secondary user makes a sensing observation by receiving electromagnetic signals in one or more antennas, in one or more locations, for one or more frequency spectrums, repeated over time. These signals are then interpreted as a sensing observation in the ON or OFF state.

As mentioned in the related art section, energy detection is one possible method of determining whether a primary user is in an ON state or an OFF state.

However, energy detection has a number of disadvantages. Energy detection is imperfect because of noise, interference and fading in the spectrum. Some types of interference can cause an energy detector to indicate the ON state when the primary user is actually in the OFF state. Such an indication that the spectrum is occupied can cause the secondary user to not transmit during this period, even though the primary user is not actually accessing the shared radio spectrum. Similarly, interference could cause an energy detector to falsely report that the primary user is in the OFF state, when in reality the traditional user is transmitting and in the ON state. This could cause the secondary radio user to transmit at the same time as the primary user, causing interference with the primary user's transmission.

Another disadvantage of energy detection is that it does not accurately predict a primary user's idle channel state at low signal-to-noise-ratios (SNR). To compensate, an energy detector may increase the time period to listen for the primary user, and take an energy detection average into account over that period of time before making a sensing decision. However, energy detection systems have difficulty distinguishing between interference and a primary user's state transition occurring during this time period from ON to OFF, or OFF to ON. In fact, the channel dwell time, defined as the average length of time that a primary user uses the spectrum, imposes a limit to the optimal window length before detection performance degrades. Further, there is a minimum SNR below which energy detection fails to detect a signal at all.

Coherent detection differs from energy detection in that the secondary user has more knowledge of the structure of the primary user's signal. Thus a secondary user can narrow its focus and zero in on specific behavior of the primary user to determine when a primary user is transmitting. However, when a frequency or timing mismatch occurs, a coherent detector is more fragile and prone to sensing errors due to noise and interference.

Pilot detection also has many of the same disadvantages as energy detection and coherent detection. A secondary user configured for pilot detection looks for a specific pilot signal transmitted by a primary user. One disadvantage of pilot detection is that the primary user must be specifically configured to carry such a signal. In application, many of the desired uses for cognitive radio are in situations where primary user networks are already in place and cannot be altered or upgraded to carry a pilot signal. Consequently, this detection scheme is of limited use.

Thus, there is a need for a better sensing method to detect whether a primary user is idle in a cognitive radio network such as the one depicted in FIG. 1. The sequence and state detection shown in this disclosure minimizes or eliminates these problems. Sequence detection performs better at low SNRs, exploits primary user state memory, increases accuracy of state and sequence determination, and allows for disparate treatment of the risk created by missed detections and false alarms.

Sensing System

Figure 2A:
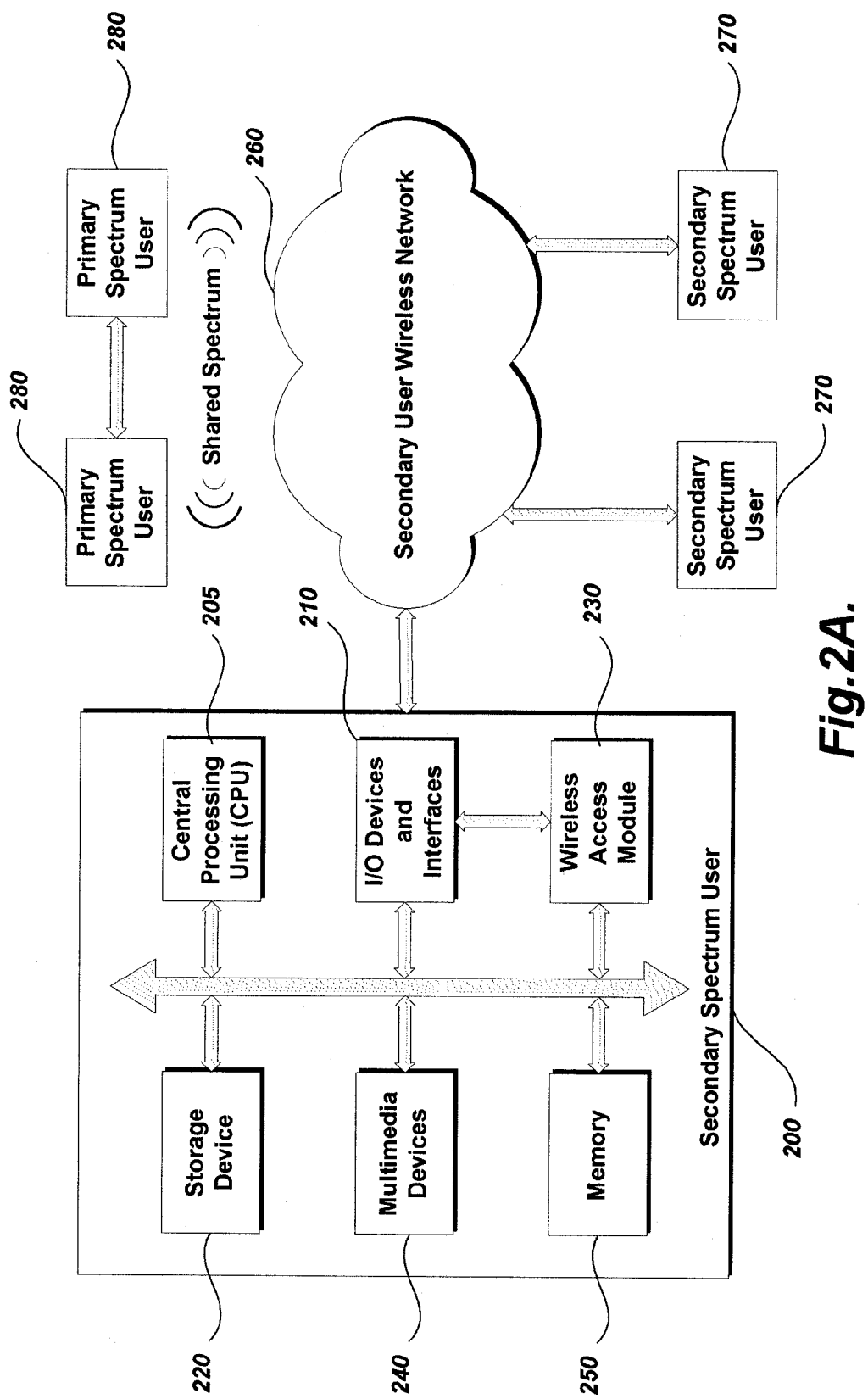
FIG. 2A is a block diagram depicting one embodiment of a system configured to run software for implementing sequence detection described herein and its relationship to other wireless network nodes.

FIG. 2A is a block diagram depicting one embodiment of a computer hardware system configured to run software for implementing one or more embodiments of the sensing systems and methods described herein.

In some embodiments, the systems and described herein take the form of a computing system 200 shown in FIG. 2A, which is a block diagram of one embodiment of a computing system (which can be a fixed system or mobile device) that is in communication with one or more other secondary user computing systems 270 and/or secondary user networks 260. The computing system 200 may be used to implement one or more of the systems, models, and methods described herein. In addition, in one embodiment, the computing system 200 may be configured to sense primary user 280 transmissions and make a determination whether any primary user 280 is in an ON state and/or determine the sequence of the recent ON/OFF states. While FIG. 2A illustrates one embodiment of a computing system 200, it is recognized that the functionality provided for in the components and modules of computing system 200 may be combined into fewer components and modules or further separated into additional components and modules.

Sensing System Components

In some embodiments, the processes, systems, and methods illustrated herein may be embodied in part or in whole in software that is running on a computing device. The functionality provided for in the components and modules of the computing device may comprise one or more components and/or modules. For example, the computing device may comprise multiple central processing units (CPUs) and storage devices, such as may be implemented in an array of computers, operating locally or geographically dispersed and communicating over a network. In some embodiments the computers may operate in parallel, each performing the same tasks and sharing information. In some embodiments the computers may be executing different software modules implementing different portions of the disclosure described herein and sharing information. Alternatively, the system may operate with a combination of parallel and specialized components.

In some embodiments, the system 200 comprises wireless access module 230 and I/O Devices and Interfaces module 210 configured to carry out the functions, methods, and/or processes described herein. The wireless access module 230 is executed on the computing system 200 by a central processing unit 205. Alternatively, the wireless access module may be executed using specialized processors (not shown). The computing system 200 further comprises a memory 250, such as random access memory ("RAM") for temporary storage of information and/or a read only memory ("ROM") for permanent storage of information, and a storage device 220, such as a hard drive, diskette, or optical media storage device. Alternatively, the storage device need not be physically attached to the computing system, and may instead be in communication over a network with the computing system, such as in the case of Network Attached Storage ("NAS") or Storage Area Network ("SAN"). There may be more than one storage device retrieving, storing, and holding data for the system. Typically, the modules of the computing system 200 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 200 comprises one or more commonly available input/output (I/O) devices and interfaces 210, such as a keyboard, mouse, touchpad, printer, display or network adapter. In one embodiment, the I/O devices and interfaces 210 comprise one or more display devices, such as a monitor, that allows the visual presentation of data to a user. In FIG. 2A, the I/O devices and interfaces 210 may provide a communications interface to various external devices, radio spectrums, or channels.

Computing System Device/Operating System

The computing system 200 may run on a variety of computing devices, such as, for example, a server, a Windows server, a Unix server, a personal computer, a mainframe computer, a laptop computer, a cell phone, a personal digital assistant, a mobile device, a kiosk, an audio player, a network gateway device, an embedded system and so forth. The computing system 200 is generally controlled and coordinated by operating system software, such as z/OS, OS X, Windows 95, Windows 98, Windows NT, Windows 2000, Windows XP, Windows Vista, Linux, BSD, SunOS, Solaris, VX Works, QNX, RTLinux, Windows CE, OSE or other compatible operating systems, including operating systems for embedded devices. In other embodiments, the computing system 200 may be controlled by a proprietary operating system, or purely made of hardware components. Operating systems control and schedule computer processes for execution, perform memory management, provide file system, networking, and I/O services, and provide a user interface, such as a graphical user interface ("GUI"), among other things.

Network

In the embodiment of FIG. 2, the computing system 200 is coupled to a secondary user network 260, such as one or more of a LAN, WAN, or the Internet, for example, via a wireless communication link. The network 260 communicates with various computing devices and/or other electronic devices via wired or wireless communication links. In FIG. 2, the network 260 is communicating with one or more secondary user computing systems 270 and using the same radio spectrum as primary users 280 during mostly idle periods. Although using the same radio spectrum as the primary users 280 and performing sensing and sequence detection as described herein, in some embodiments the secondary user 200 may communicate with the wireless network and other secondary user devices or systems 270 by running traditional layer 2 protocols under the OSI model on top of its use of the cognitive radio spectrum so as to multiplex secondary user use and provide for channel access control. For example, in some embodiments, once an OFF state sensing decision has been made and sent to a sensing decision consumer discussed herein, that consumer may communicate with other secondary users 270 to determine which secondary user node will have access to the spectrum and how the primary user 280 idle spectrum should be utilized. Examples of channel access control mechanisms to be used separately or in combination are FDMA, OFDMA, TDMA, CDMA, SDMA, ALOHA, CSMA/CA, Token Ring, CSMA, schemes used in GSM, and their variations among many others. Duplexing may also occur using any time division or frequency division scheme. In some embodiments, the media access control and duplexing mechanisms will be configured to be executed in the same module as all or portions of the sensing and sequence detection module(s), or execute separately in another module, or in another layer of computer abstraction.

Wireless Access Module

Figure 2B:
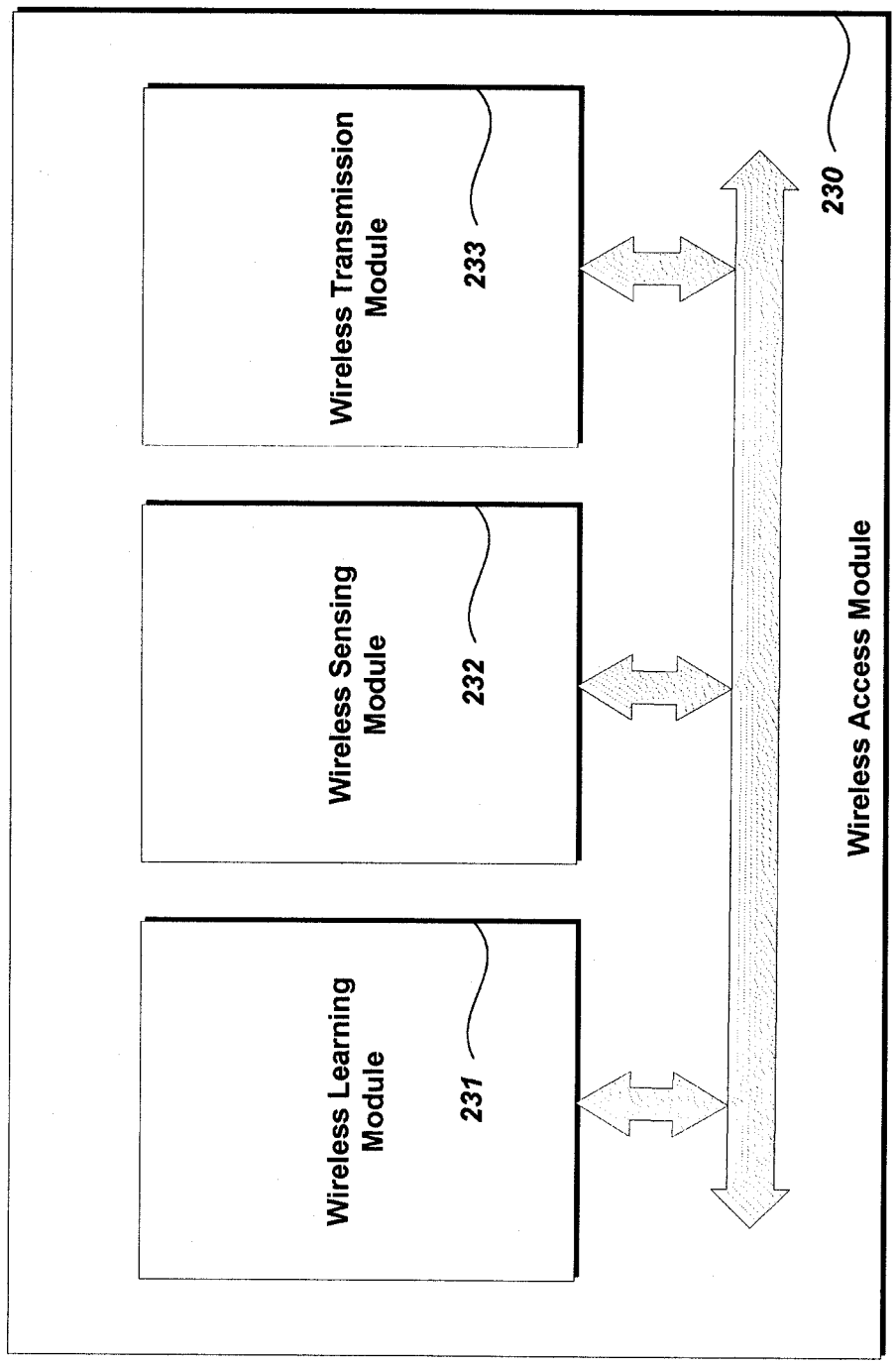
FIG. 2B is a block diagram depicting one embodiment of a wireless access module implementing one or more embodiments of the sequence detection system described herein.

In some embodiments, the wireless access module 230 may be split into various component submodules. Turning to FIG. 2B, one embodiment may comprise of a Wireless Learning Module 231, a Wireless Sensing Module 232, and a Wireless Transmission Module 233. The all or a portion of the wireless access module may further be a part of the I/O devices module 210, or vice versa. In one embodiment, the wireless access module 230 may learn primary user spectrum user parameters in the Wireless Learning module 231, make a sensing decision in the Wireless Sensing Module 232, and make a transmission decision in the Wireless Transmission Module 233.

The wireless access module 230 may also have less submodules than pictured in FIG. 2B. For example, the wireless learning module 231 may not be necessary when primary user spectrum parameters are already known or not determined during run-time. Additionally, the wireless transmission module 233 may not be necessary when the system with the wireless access module is merely tracking primary user state and reporting to a sensing decision consumer that is in a separate system.

Figure 2D:
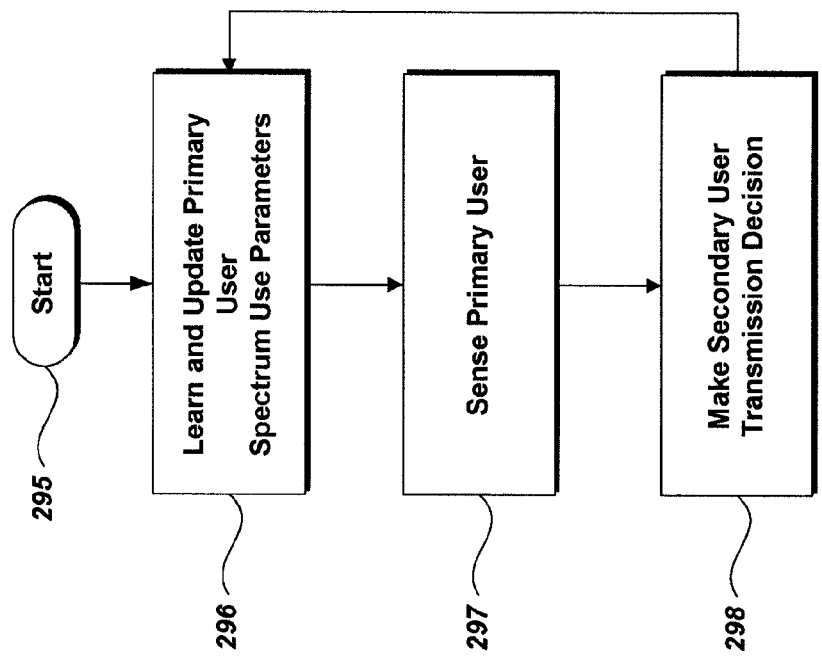
FIG. 2D is a process flow diagram of one embodiment for sensing, sequence detection, and transmission by a secondary user.
Figure 2C:
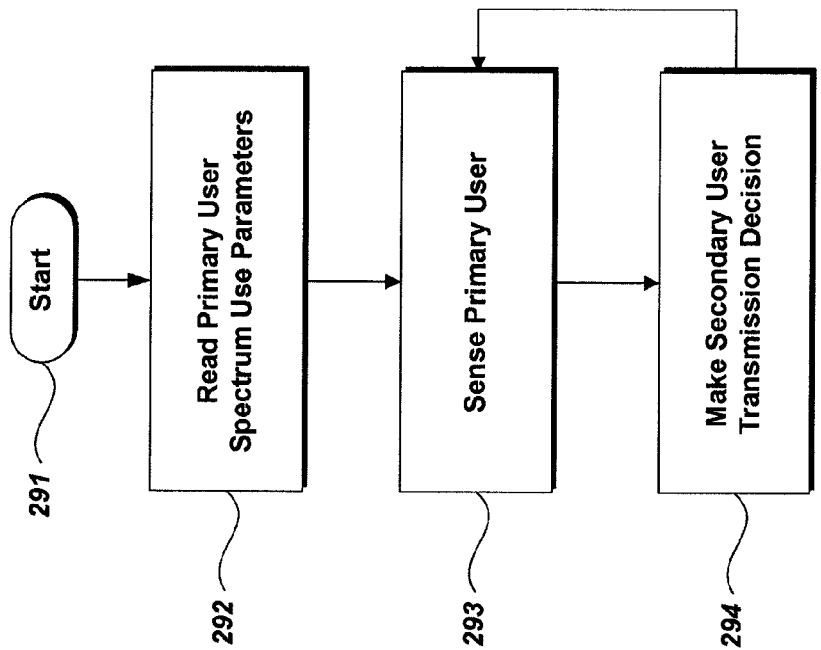
FIG. 2C is a process flow diagram of one embodiment for sensing, sequence detection, and transmission by a secondary user.

Focusing on FIG. 2C, in some embodiments Wireless Access Module 230 comprises a combination of submodule(s) implementing all or portions of the Wireless Sensing Module 232 and Wireless Transmission Module 233. The wireless access module 230 may run a process using the diagramed sequence. Upon startup of the routine 291, the primary user spectrum use parameters, described herein, are read as input 292. Additionally, during this stage, or any other appropriate stage before use, the cost factor(s), described herein, may be read as input. Next, the process observes and senses the primary user 293. During this portion, based in part on the primary user spectrum use parameters, and past and/or present sensing observations of the primary user's ON or OFF state, the system 200 makes a sensing decision. It does so using methods and techniques described herein. Based on this process, the sense primary user block 293 outputs a potential primary user state, state sequence signal, or any variety of sequences, states, calculated probabilities, and/or calculated risks related to the sensing decision to a sensing decision consumer.

A sensing decision consumer is any process or storage device that accepts one or more outputs of the sense primary user block 293, such outputs being one or more potential primary user states, including a sequence of primary user states. In some embodiments, a potential user state is a representation of either an ON or OFF signal. A potential primary user state may correspond to any transmission mode of the primary users of the spectrum. Furthermore, the sense primary user block 293 could output a potential user state or state sequence for multiple channels, or multiple time periods, resulting in multiple outputs. Moreover, the output to a sensing decision consumer may encompass contextual information about the sensing analysis made by the sense primary user block 293. This contextual information is related to the sensing analysis performed. For example, instead of outputting a chosen state or state sequence, the output may comprise one or more probabilities of a state occurring during an observation time period or observation time period sequence. Alternatively, or in combination, primary user block 293 may also output the risk or weighted risk of a state, sequence, or a series of states in a sequence. By providing context information to the sensing decision consumer, any module(s) making a transmission decision may do so more accurately at the cost of potential delay and complexity. Together, the possible output set of a single state, multiple states, a state sequence, multiple state sequences, calculated risks and/or state probabilities comprise the possible options for a primary user state estimate. The various forms of the primary user state estimate can be used by the sensing decision consumer to make a transmission decision and/or study spectrum behavior.

For example, a sensing decision consumer can be a storage device, connected directly or through a network, that stores the output from block 293. In some embodiments, another process would read from the sensing decision consumer and make a secondary user transmission decision as shown in block 294. Another example of a sensing decision consumer is a process executing on the same computer device, or another computing device in communication over a network or bus with the computer or computers executing block 293. This process would accept the output(s) from the sense primary user block 293 and may make a secondary transmission decision as shown in block 294. In some embodiments, a sensing decision consumer does not make a secondary transmission decision, and instead stores the sensing outcome(s) for later study or analysis. Under this embodiment, or any embodiment where a secondary user transmission decision is not made, block 293 may be repeatedly executed without moving on to block 294.

Any secondary user transmission decision made in block 294 is based, at least in part, on the output from the sense primary user block 293, and may also take into account higher level, OSI layer 2, channel access and duplexing schemes mentioned herein. Although the sensing block in 293 may output that the primary user state is OFF, that does not mean that block 294 must decide that the secondary user must transmit. Instead, the sensing mechanism can be but one input in the decision in block 294, and the decision may be made taking into account many additional factors known to a skilled artisan.

In some embodiments, once the secondary user transmission decision has been made, the process in FIG. 2C repeats with another sensing block 293. This allows the secondary user to constantly sense and make a transmission decision during a specific time period. In some embodiments, block 293 and block 294 are not strictly executed one after another, and are instead run in parallel, or partially in parallel and partially in a serial process. For example, in one such embodiment, each output from the sense primary user block is input into a future block 294, and block 293 does not wait for any transmission decision in 294 to be made before sensing the spectrum once again.

In some embodiments illustrated by FIG. 2D, the overall process performs similarly to the process in FIG. 2C, except with a slight change. In FIG. 2D with a process operating in a serial manner, after the secondary user transmission decision is made in block 298 (corresponding to a similar decision in 294), the process returns to block 296 where the wireless access module 230 continues to update the primary spectrum use parameters based on observed behavior of the primary user spectrum. Thus, in some embodiments, the primary user spectrum use parameters can change, and are read in to the sense primary user block multiple times rather than once. Similar to the blocks in FIG. 2C, blocks 296, 297, and 298 may all be executed serially as illustrated, or in a parallel or partially parallel manner.

Overall, for the high level function of the wireless access module 230, whether implemented as a single module on a single computer system or embedded device, or separate or partially separate module on the same computer system, or as a network of computer systems or embedded devices, three processes can occur: reading and/or updating the spectrum use parameters, sensing the primary user and/or outputting one or more potential primary user states based on sensing observations, primary spectrum use parameters, and/or (in some embodiments) cost factors, and/or making a secondary transmission decision based on the outputs.

Sensing, Hidden Markov Models and Sequence Detection

In the sensing block discussed herein, sequence detection may be performed to determine the sensing block's output to a sensing decision consumer. Sequence detection may be implemented by the wireless access module by using a hidden Markov model of any order. Detecting sequences, as opposed to detecting only a single ON or OFF state considered in isolation, can reduce interference to primary and secondary users.

Figure 3:
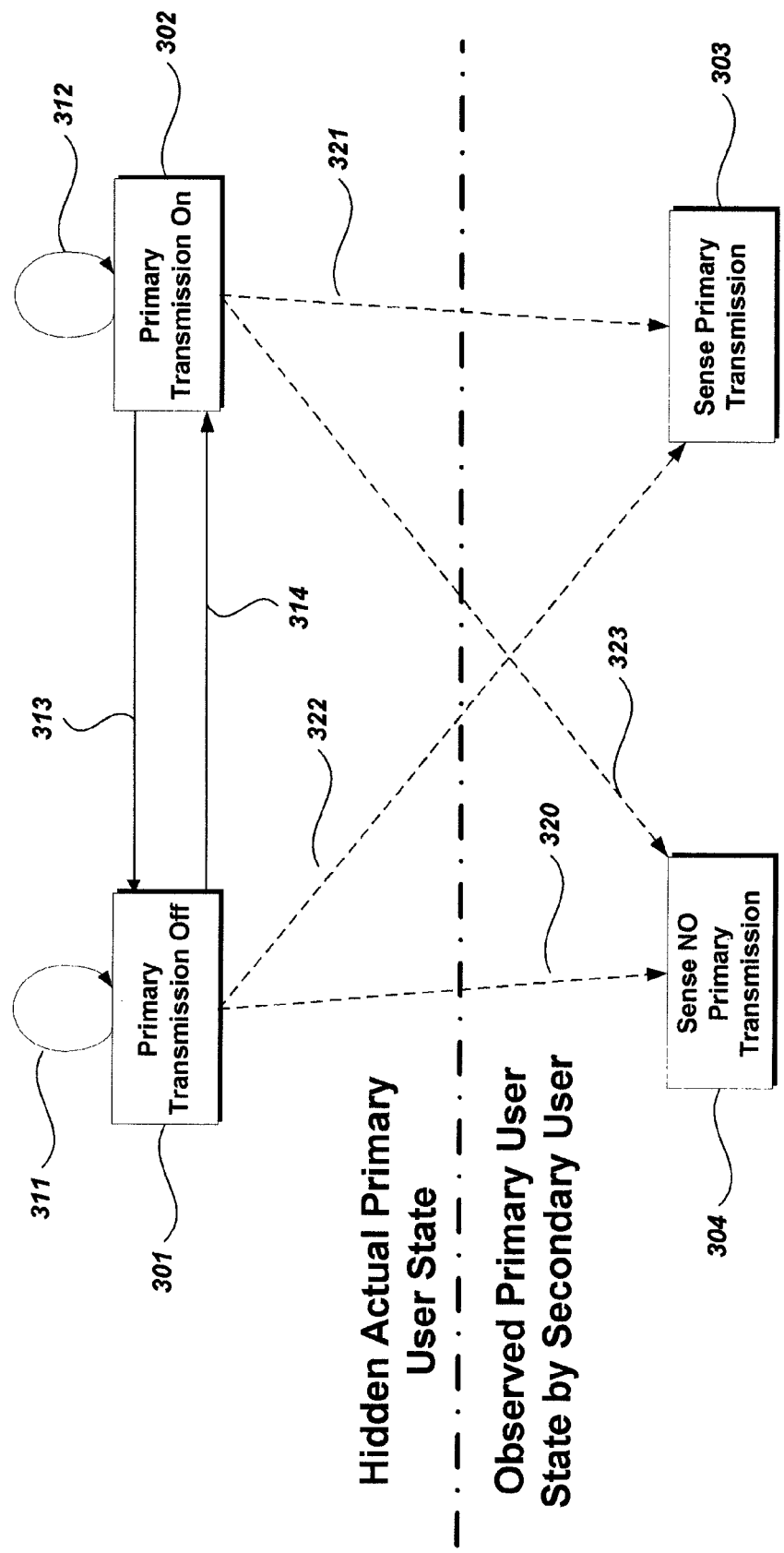
FIG. 3 is a diagram illustrating some embodiments use of a hidden Markov model designed for exploiting primary user state history.

FIG. 3 illustrates a first order primary user state hidden Markov model as used in some embodiments. As described above, a skilled artisan will recognize that, a primary user has at least two potential states during any observed time period: when one or more primary users are transmitting, called the ON state 302 (often associated with a 1), or when all primary users are not transmitting, called the OFF state 301 (often associated with a 0). During the next measured time period, there is a probability that the state will either stay the same, and a complimentary probability that the state will change. For example, if the current state is OFF 301, there is a probability associated with state transition 314 that the next state will is ON 302. Similarly, there is a probability associated with station transition 311 that the next state will be another OFF state. The probabilities associated with 311 and 314 in this embodiment sum to 1. Likewise, the probabilities, given an ON state, transitions 312 and 313, sum to 1. This gives four values for a state transition probability matrix: OFF to OFF denoted $p_{00}$, OFF to ON denoted $p_{01}$, ON to OFF denoted $p_{10}$, and ON to ON denoted $p_{11}$. Further, to begin the model, the wireless access module may require the probability of starting in each state, which also sums to 1. The probability of starting in state OFF is called $\pi_0$, and the probability of starting in state ON is called $\pi_1$.

However, because the secondary user experiences interference in receiving any signals from the one or more primary users, the secondary user may not know the true state that the primary user is in. Instead, the secondary user may only make a sensing observation for each time period about the primary user.

A sensing observation during any time period may be made using any observation sensing scheme, including energy, coherent and pilot detection. There are at least two potential observations for each time period: Sensing a Primary Transmission 304, and Sensing no Primary Transmission 303. Given the current primary user state, there is a probability associated with each given observation. For example, if the primary transmission is ON 302, there is a probability 321 that the observed state is also ON 303, and a probability 323 that the observed state is OFF 304. These two probabilities sum to 1. Likewise, the probabilities for observing an ON or OFF state, 320 and 322, given an OFF state also sum to 1.

Given all of the probabilities above, called the primary user spectrum use parameters collectively, and given a set of observations corresponding to a set of consecutive time periods (i.e. a sequence of observations), one can determine the probability of being in each potential state during each time period in the set of observations. The primary user spectrum use parameters required by some embodiments need not necessarily be the probabilities discussed above represented in floating point form. In some embodiments, the parameters could potentially be probability density functions, or cumulative distribution functions, or primary use channel ON/OFF dwell times. The probabilities mentioned above can be determined using these parameters. Further, as described above, the primary user spectrum use parameters may be learned online or on the fly, and be altered during the execution of the wireless access module 230.

One or more primary user spectrum use parameters, together a vector of parameters, may be stored in one or more data storage devices accessible by the wireless access module, as disclosed herein.

Sensing Errors

Figure 4:
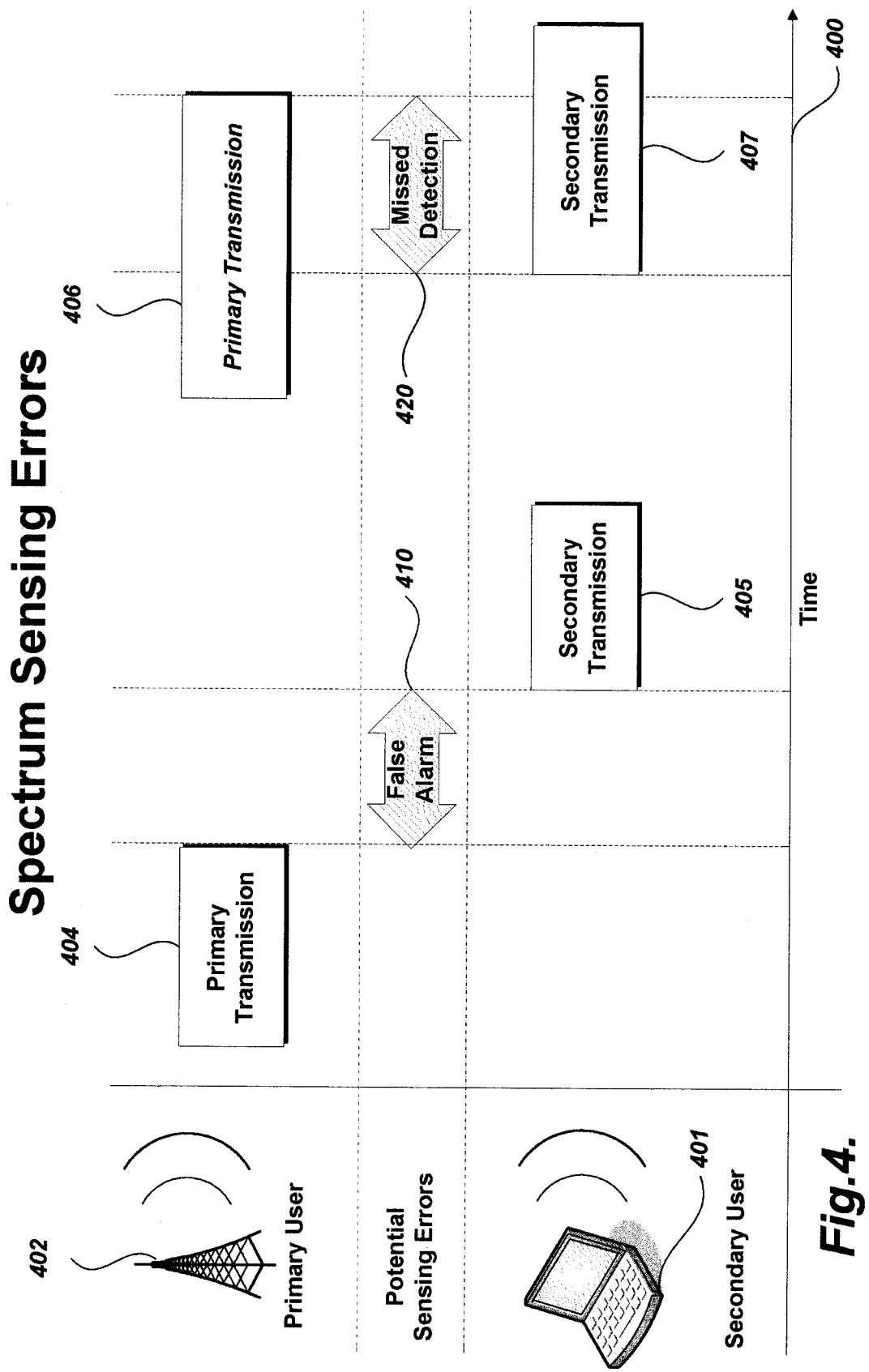
FIG. 4 is a timing diagram illustrating the sensing errors of false alarm and missed detection.

FIG. 4 is a timing diagram illustrating the sensing errors of false alarm and missed detection. A secondary user may attempt to transmit during observed idle periods of transmission. However, because of the interference discussed above, and the uncertainty of the primary user's state as known to the secondary user, there may be occasional errors.

A false alarm error 410 occurs if the secondary user determines that the primary user is still in the transmission ON state when in reality the primary user is in the transmission OFF state. The probability of a false alarm is equal to the probability of the observation of an ON state when the true transmission is an OFF state, 322. In FIG. 4, the primary user 402 was transmitting during period 404. The secondary user 401 failed to detect that the primary user 402 had stopped transmitting, thus during the false alarm period 410, the secondary user did not transmit. Eventually, the secondary user makes another observation and realizes that the primary user is not transmitting, and begins to transmit 405. A false alarm error decreases the secondary user's 401 transmission throughput. Had there been no error, the secondary user 401 would have had more time and/or spectrum to transmit. The primary user is unaffected.

A missed detection error 420 occurs if the secondary user determines that the primary user is still in the transmission OFF state when in reality the primary user is in the transmission ON state. The probability of a missed detection is equal to the probability of the observation of an ON state when the true transmission is an OFF state, 323. In FIG. 4, the primary user 402 was transmitting during period 406. The secondary user 401 detected no transmission starting at the time period bounded by 420, thus during the missed detection period 420, the secondary user began transmitting 407. A missed detection error may inhibit both the primary user's throughput and the secondary user's throughput, because both the primary user's signals and the secondary user's signals may experience interference. Thus, unlike a false alarm, a missed detection may negatively affect the primary user.

Risk Analysis

Because the errors detailed above may increase interference with the primary user and reduce primary user and secondary user throughput, it is often desirable to minimize these errors.

Some embodiments minimize the errors by employing a risk analysis. Given a sequence of observations of length T, there exists $2^T$ possible sequences of the true primary state sequence. Let $\underline{S}$ denote the true state sequence, and $\underline{Y}$ the primary user measurement observation sequence, and $\underline{\hat{S}}$ the sensing decision sequence. The risk value of one sequence of the $2^T$ sequences is the expected value of the cost of declaring that sequence to be the sensing decision, give the current sequential set of observations over time. This function can be formulated as the sum of all costs of declaring sequence i to be used for sensing, given that the true sequence is sequence j, multiplied by the probability of sequence j given the current sequence of observations made, for all $2^T$ possible j sequences. In other words, $$R(\underline{s}^{(i)} \mid \underline{Y}) = \sum_{j=1}^{2^T} C(\underline{s}^{(i)}, \underline{s}^{(j)}) * P(\underline{s}^{(j)} \mid \underline{Y}),$$

where $R(\underline{s}^{(i)}|\underline{Y})$ is the risk function of the declared sequence i given the current observations, $C(\underline{s}^{(i)},\underline{s}^{(j)})$ is the cost of declaring sequence i given the real sequence is sequence j, and $P(\underline{s}^{(j)}|\underline{Y})$ is the probability of sequence j occurring given the current observations. Other functions are possible.

In some embodiments, given the calculated risks for all possible declared sequences i, the wireless access module selects the sequence with the lowest possible risk. In other words, it finds the minimum risk sequence $\underline{\hat{S}}$ where $$\underline{\hat{S}} \underset{\underline{s}^{(i)}, 1 \leq i \leq 2^T}{\operatorname{argmin}} R(\underline{s}^{(i)} \mid \underline{Y}).$$

Sequence Determination

By assigning a cost value of 0 if declared sequence i is the real sequence, i.e. $\underline{s}^{(i)}=\underline{s}^{(j)}$, and a cost value of 1 if declared sequence i is not the real sequence, i.e. $\underline{s}^{(i)} \neq \underline{s}^{(j)}$, then this process of minimizing the risk function can be simplified by using the Viterbi algorithm. The Viterbi algorithm finds the sequence of hidden states in a hidden Markov model with the maximum conditional probability. For a given set of primary user observations, this implementation by the wireless access module can find the primary user state sequence with the highest conditional probability. By finding the sequence $\underline{\hat{S}}^{(j)}$ with the maximum a posteriori probability of being the real state sequence, i.e. the sequence MAP estimate, the risk function $R(\underline{s}^{(i)}|\underline{Y})$ will be minimized compared to the risk functions of all other possible sequences because this sequence will have the least associated cost. Because its $P(\underline{s}^{(j)}|\underline{Y})$ will be the largest probability when j=i and the associated cost will equal 0, the sum of costs when j≠i will be minimized. Thus, the Viterbi implementation will find the minimum risk sequence $\underline{\hat{S}}$ under these cost constraints.

A skilled artisan will recognize that the Viterbi implementation can be calculated by the wireless access module using recursion. The Viterbi implementation finds the most probable path, $\delta_t(k)$, ending in state k at time t given the whole sequence of primary state observations. In some embodiments, for a two state ON (1) and OFF (0) primary user state observation sequence, the recurrence equation $$\delta_t(k) = \max_{l \in \{0,1\}} [\delta_{t-1}(k) p_{lk}] f_{Y_t|S_t}(y_t \mid k),$$

with initialization $\delta_1(i) = \pi_t f_{Y_1|S_1}(y_1|k)$, where $\pi_k$ is either the primary user spectrum parameter $\pi_0$ or $\pi_1$, $p_{lk}$ corresponds to the probabilities $p_{00}$, $p_{10}$, $p_{10}$ and $p_{11}$, and $f_{Y_t|S_t}(y_t|k)$ is the probability density function of the observations in state k coinciding with 320, 321, 322 and 323 in FIG. 3 as discussed herein. The argument $\psi_t(k)$, where $$\psi_t(k) = \operatorname*{argmax}_{l \in \{0,1\}} \delta_{t-1}(l) p_{lk}, \ 2 \leq t \leq T,$$

which maximizes the above recurrence equation should be tracked, so that at the end of the calculations, the highest probability endpoint is chosen and the highest probability path, $\underline{\hat{S}}$, is backtracked using $$\hat{S}_T = \operatorname*{argmax}_{k \in \{0,1\}} \delta_T(k),$$

and $\hat{S}_t = \psi_{t+1}(\hat{S}_{t+1})$ for t=T−1 to 1. This is but one exemplary implementation of the Viterbi algorithm, and a skilled artisan will recognize other ways of implementing the Viterbi algorithm.

One drawback of using the Viterbi implementation to detect a sequence with the minimum risk is that the cost of the risk for a missed detection is equal to the cost of the risk for false alarm. Furthermore, a sequence with multiple errors carries the same risk as a sequence with a single error. Thus, the implementation makes no distinction between multiple errors or different kinds of errors.

Separate Missed Detection and False Alarm Costs

Instead of using a 0 and 1 cost for entire sequences above, in some embodiments, the wireless access module may distinguish individual decisions in a sequence of decisions, and distinguish between the cost of a false alarm and missed detection, by using an additive cost formulation. The cost of declaring sequence $\underline{s}^{(i)}$, when the true sequence was $\underline{s}^{(j)}$, can be set equal to the sum of the costs of declaring state k in sequence $\underline{s}^{(i)}$ when the real state is state l in sequence $\underline{s}^{(j)}$ at any time instant. In other words, in some embodiments that isolate individual decisions and/or distinguish costs for false alarms and missed detections, $C(\underline{s}^{(i)},\underline{s}^{(j)})$ is now equal to $$\sum_{t=1}^{T} C(s_t^{(i)}, s_t^{(j)})$$

where $s_t^{(i)}$ is the state of the sequence $\underline{s}^{(i)}$ at time t. To do this comparison, some embodiments may use a state risk function, $R_t(k|\underline{Y})$, that is the risk of declaring state k at time instant t, given the observation sequence $\underline{Y}$, to calculate the risk function for a sequence, $R(\underline{s}^{(i)}|\underline{Y})$.

The state risk function $R_t(k|\underline{Y})$ can be formulated as $$R_t(k \mid \underline{Y}) = \sum_{l \in \{0,1\}} C_{kl} P(S_t = l \mid \underline{Y}),$$

where can k equal 0 or 1, as noted above, as it is the sum of the costs of transition for the state multiplied by the probability of that state occurring given the sequence. Relating the sequence risk function to the state risk function, the sequence risk function is equal to the sum of all the individual state risk functions, i.e.

$$R(\underline{s}^{(i)} \mid \underline{Y}) = \sum_{t=1}^{T} R_t(s_t^{(i)} \mid \underline{Y}),$$

where $s_t^{(i)}$ is either ON (1), or OFF (0). Because this sequence risk function is additive when the state risk function is additive, some embodiments of the wireless access module may use a simplified version of the state sequence equation that determines each portion of the minimum risk sequence state by state, i.e.

$$\hat{S}_t = \operatorname*{argmin}_{k \in \{0,1\}} \{R_t(k \mid \underline{Y} = \underline{y})\}.$$

To determine $\underline{\hat{S}}$ using the state risk function, $$R_t(k \mid \underline{Y}) = \sum_{l \in \{0,1\}} C_{kl} P(S_t = l \mid \underline{Y}),$$

the wireless access module may use the forward-backward algorithm. The wireless module's application of the forward backward algorithm can comprise three blocks that are not necessarily computed in the order listed, and portions may be done serially or in parallel: compute forward probabilities for each time instant which is the likelihood of earlier observations given current state, compute backward probabilities for each time instant which is the likelihood of later observations given current state, and compute the a posterior probability of each state for each time instant based on the forward and backward probabilities. The posterior probabilities are then used to detect the sequence with the minimum risk given appropriate costs.

Forward-Backward Example

The following example of the wireless access module's forward-backward implementation is meant as an illustration only. The various data structures and implementation actually used can vary widely. Turning to FIG. 5A, there are 5 observations 550. In set 550, from left to right, the observation sequence is OFF, OFF, ON, OFF, OFF corresponding to the set of observations {0,0,1,0,0}.

To calculate forward probabilities, we use $\alpha_t(k)=f_{\underline{Y}_t|S_t}(\underline{y}_t|k)$, where $\alpha_t(k)$ corresponds to the probability density function of the partial observation sequence $\underline{y}^t=(y_1, y_2, y_3 \ldots y_t)$, which can be solved recursively using $\alpha_1(k)=\pi_k f_{Y_1|S_1}(y_1|k)$ and $$\alpha_t(k) = \left(\sum_{l \in \{0,1\}} \alpha_{t-1}(l) p_{kl}\right) f_{Y_t|S_t}(y_t | k).$$

Thus, given primary user spectrum use parameters $p_{00}$=0.7, $p_{01}$=0.3, $p_{10}$=0.3, $p_{11}$=0.7, $\pi_0$=0.5, $\pi_1$=0.5, $o_{00}$=0.9, $o_{10}$=0.1, $o_{01}$=0.2, and $o_{11}$=0.8 (where $o_{kl}$ corresponds to the probability of observing state k given the true state is state l, corresponding to events depicted in 320-323), the following forward state probabilities will be calculated as follows, where c is a normalization constant:

$$\alpha_0(0) = \pi_0 = 0.5,$$

$$\alpha_0(1) = \pi_1 = 0.5$$

$$\alpha_1(0) =$$
$$c_1 \pi_0 f_{Y_1|S_1}(y_1|0) = 0.5 * (0.9 * 0.7 + 0.9 * 0.3)c_1 = 0.45c_1 = 0.8182$$

$$\alpha_1(1) = c_1 \pi_1 f_{Y_1|S_1}(y_1|1) = 0.5 * (0.2 * 0.3 + 0.2 * 0.7)c_1 = 0.1c_1 = 0.1818$$

$$\alpha_2(0) = c_2 \left(\sum_{l \in \{0,1\}} \alpha_1(l) p_{0l}\right) f_{Y_2|S_2}(y_2|0) =$$
$$((0.8182 * .7) + (0.1818 * 0.3)) * (0.9)c_2 = 0.8834$$

$$\alpha_2(1) = c_2 \left(\sum_{l \in \{0,1\}} \alpha_1(l) p_{1l}\right) f_{Y_2|S_2}(y_2|1) =$$
$$((0.8182 * .3) + (0.1818 * 0.7)) * (0.2)c_2 = 0.1166$$

$$\alpha_3(0) = c_3 \left(\sum_{l \in \{0,1\}} \alpha_2(l) p_{0l}\right) f_{Y_3|S_3}(y_3|0) =$$
$$((0.8834 * .7) + (0.1166 * 0.3)) * (0.1)c_3 = 0.1907$$

$$\alpha_3(1) = c_3 \left(\sum_{l \in \{0,1\}} \alpha_2(l) p_{1l}\right) f_{Y_3|S_3}(y_3|1) =$$
$$((0.8834 * .3) + (0.1166 * 0.7)) * (0.8)c_3 = 0.8093$$

$$\alpha_4(0) = c_4 \left(\sum_{l \in \{0,1\}} \alpha_3(l) p_{0l}\right) f_{Y_4|S_4}(y_4|0) =$$
$$((0.1907 * .7) + (0.8093 * 0.3)) * (0.9)c_4 = 0.7308$$

$$\alpha_4(1) = c_4 \left(\sum_{l \in \{0,1\}} \alpha_3(l) p_{1l}\right) f_{Y_4|S_4}(y_4|1) =$$
$$((0.1907 * .3) + (0.8093 * 0.7)) * (0.2)c_{44} = 0.2692$$

-continued $$\alpha_5(0) = c_5 \left(\sum_{l \in \{0,1\}} \alpha_4(l) p_{0l}\right) f_{Y_5|S_5}(y_5|0) =$$
$$((0.7308 * .7) + (0.2692 * 0.3)) * (0.9)c_5 = 0.8673$$

$$\alpha_5(1) = c_5 \left(\sum_{l \in \{0,1\}} \alpha_4(l) p_{1l}\right) f_{Y_5|S_5}(y_5|1) =$$
$$((0.7308 * .3) + (0.2692 * 0.7)) * (0.2)c_5 = 0.1327$$

To calculate backward probabilities, some embodiments of the wireless access module uses $\beta_t(k)$ corresponding to the probability density function of the partial observation sequence from $y_{t+1}$ to the end produced by all state sequences that start at the ith state. In other words, $\beta_t(k)=f_{Y_{t+1}, \ldots, Y_T|S_t}(y_{t+1}, \ldots |k)$. Similar to the forward probabilities, the wireless access module may solve this recursively, using $\beta_T(k)=1$, and $$\beta_t(k) = \sum_{l \in \{0,1\}} p_{kl} f_{Y_{t+1}|S_{t+1}}(y_{t+1}|l) \beta_{t+1}(l),$$

where k can be 0 or 1. Thus, for this example, using a normalization constant d, it yields:

$$\beta_5(0) = 1$$

$$\beta_5(1) = 1$$

$$\beta_4(0) = d_4 \sum_{l \in \{0,1\}} p_{0l} f_{Y_5|S_5}(y_5|l) \beta_5(l) =$$
$$d_4(0.7 * 0.9 * 1 + 0.3 * 0.2 * 1) = 0.69d_4 = 0.6273$$

$$\beta_4(1) = d_4 \sum_{l \in \{0,1\}} p_{1l} f_{Y_5|S_5}(y_5|l) \beta_5(l) =$$
$$d_4(0.3 * 0.9 * 1 + 0.7 * 0.2 * 1) = 0.41d_4 = 0.3727$$

$$\beta_3(0) = d_3 \sum_{l \in \{0,1\}} p_{0l} f_{Y_4|S_4}(y_4|l) \beta_4(l) =$$
$$d_3(0.7 * 0.9 * 0.6273 + 0.3 * 0.2 * 0.3727) = 0.6533$$

$$\beta_3(1) = d_3 \sum_{l \in \{0,1\}} p_{1l} f_{Y_4|S_4}(y_4|l) \beta_4(l) =$$
$$d_3(0.3 * 0.9 * 0.6273 + 0.7 * 0.2 * 0.3727) = 0.3467$$

$$\beta_2(0) = d_2 \sum_{l \in \{0,1\}} p_{0l} f_{Y_3|S_3}(y_3|l) \beta_3(l) =$$
$$d_2(0.7 * 0.1 * 0.6533 + 0.3 * 0.8 * 0.3467) = 0.3763$$

$$\beta_2(1) = d_2 \sum_{l \in \{0,1\}} p_{1l} f_{Y_3|S_3}(y_3|l) \beta_3(l) =$$
$$d_2(0.3 * 0.1 * 0.6533 + 0.7 * 0.8 * 0.3467) = 0.6237$$

$$\beta_1(0) = d_1 \sum_{l \in \{0,1\}} p_{0l} f_{Y_2|S_2}(y_2|l) \beta_2(l) =$$
$$d_1(0.7 * 0.9 * 0.3763 + 0.3 * 0.2 * 0.6237) = 0.5923$$

$$\beta_1(1) = d_1 \sum_{l \in \{0,1\}} p_{1l} f_{Y_2|S_2}(y_2|l) \beta_2(l) =$$
$$d_1(0.3 * 0.9 * 0.3763 + 0.7 * 0.2 * 0.6237) = 0.4077$$

$$\beta_0(0) = d_0 \sum_{l \in \{0,1\}} p_{0l} f_{Y_1|S_1}(y_1|l) \beta_1(l) =$$
$$d_0(0.7 * 0.9 * 0.5923 + 0.3 * 0.2 * 0.4077) = 0.6469$$

$$\beta_0(1) = d_0 \sum_{l \in \{0,1\}} p_{1l} f_{Y_1|S_1}(y_1|l) \beta_1(l) =$$
$$d_0(0.3 * 0.9 * 0.5923 + 0.7 * 0.2 * 0.4077) = 0.3531$$

To calculate the posterior probabilities, some embodiments of the wireless access module uses $\lambda_t(k)$, corresponding to $$\lambda_t(k) = \frac{\alpha_t(k)\beta_t(k)}{\sum_{l \in \{0,1\}} \alpha_t(l)\beta_t(l)}$$

which is the normalized multiplication of forward and backward probabilities corresponding to an observation time period and a specific state k. Thus, for this example, yields:

$$\lambda_0(0) = \frac{\alpha_0(0)\beta_0(0)}{\sum_{l \in \{0,1\}} \alpha_0(l)\beta_0(l)} = (0.5*0.6469)/(0.5*0.6469 + 0.5*0.3531) = 0.6469$$

$$\lambda_0(1) = \frac{\alpha_0(1)\beta_0(1)}{\sum_{l \in \{0,1\}} \alpha_0(l)\beta_0(l)} =$$

$$(0.5*0.3531)/(0.5*0.6469 + 0.5*0.3531) = 0.3531$$

$$\lambda_1(0) = \frac{\alpha_1(0)\beta_1(0)}{\sum_{l \in \{0,1\}} \alpha_1(l)\beta_1(l)} =$$

$$(0.8182*0.5923)/(0.8182*0.5923 + 0.1818*0.4077) = 0.8673$$

$$\lambda_1(1) = \frac{\alpha_1(1)\beta_1(1)}{\sum_{l \in \{0,1\}} \alpha_1(l)\beta_1(l)} =$$

$$(0.1818*0.4077)/(0.8182*0.5923 + 0.1818*0.4077) = 0.1327$$

$$\lambda_2(0) = \frac{\alpha_2(0)\beta_2(0)}{\sum_{l \in \{0,1\}} \alpha_2(l)\beta_2(l)} =$$

$$(0.8834*0.3763)/(0.8834*0.3763 + 0.1166*0.6237) = 0.8204$$

$$\lambda_2(1) = \frac{\alpha_2(1)\beta_2(1)}{\sum_{l \in \{0,1\}} \alpha_2(l)\beta_2(l)} =$$

$$(0.1166*0.6237)/(0.8834*0.3763 + 0.1166*0.6237) = 0.1796$$

$$\lambda_3(0) = \frac{\alpha_3(0)\beta_3(0)}{\sum_{l \in \{0,1\}} \alpha_3(l)\beta_3(l)} =$$

$$(0.1907*0.6533)/(0.1907*0.6533 + 0.8093*0.3467) = 0.3075$$

$$\lambda_3(1) = \frac{\alpha_3(1)\beta_3(1)}{\sum_{l \in \{0,1\}} \alpha_3(l)\beta_3(l)} =$$

$$(0.8093*0.3467)/(0.1907*0.6533 + 0.8093*0.3467) = 0.6925$$

$$\lambda_4(0) = \frac{\alpha_4(0)\beta_4(0)}{\sum_{l \in \{0,1\}} \alpha_4(l)\beta_4(l)} =$$

$$(0.7308*0.6273)/(0.7308*0.6273 + 0.2692*0.3727) = 0.8204$$

$$\lambda_4(1) = \frac{\alpha_4(1)\beta_4(1)}{\sum_{l \in \{0,1\}} \alpha_4(l)\beta_4(l)} =$$

$$(0.2692*0.3727)/(0.7308*0.6273 + 0.2692*0.3727) = 0.1796$$

$$\lambda_5(0) = \frac{\alpha_4(0)\beta_4(0)}{\sum_{l \in \{0,1\}} \alpha_4(l)\beta_4(l)} = (0.8673*1)/(0.8673*1 + 0.1327*1) = 0.8673$$

$$\lambda_5(1) = \frac{\alpha_4(1)\beta_4(1)}{\sum_{l \in \{0,1\}} \alpha_4(l)\beta_4(l)} = (0.1327*1)/(0.8673*1 + 0.1327*1) = 0.1327$$

In some embodiments, normalization will not occur in the forward and/or backwards blocks, as it is not strictly necessary, and only provides for easier visualization of the probabilities.

To determine the sequence that minimizes the risk, the wireless access module may use $\lambda_t(k)$ in some embodiments because each state of the sequence is determined by $$\hat{S}_t = \underset{k \in \{0,1\}}{\operatorname{argmin}} \{R_t(k \mid \underline{Y} = \underline{y})\}, \text{ and } R_t(k \mid \underline{Y}) = \sum_{l \in \{0,1\}} C_{kl}\lambda_t(l),$$

thus $$\hat{S}_t = \underset{k \in \{0,1\}}{\operatorname{argmin}} \sum_{l \in \{0,1\}} C_{kl}\lambda_t(l).$$

If the cost of correct sensing (denoted $C_{00}, C_{11}$) is 0, and the cost of all sensing errors (denoted as $C_{01}, C_{10}$) is 1, then the result is the sequence of T states produced by the greater $\lambda_t(k)$ state, where k can be 0 or 1, for each observation t, where t runs from the oldest observation in the sensing window to the newest observation in the sensing window (i.e. 0 . . . T).

Sensing Error Policy Goals and Unequal Costs

The costs detailed above can be used for implementing sensing error policy goals as discussed below.

In some embodiments, there are advantages to setting unequal costs for $C_{01}$ and $C_{10}$ because $C_{01}$ is the cost for a missed detection, and $C_{10}$ is the cost for false alarm. As discussed herein, the effect on the primary user is greater for a missed detection because the secondary user is likely to transmit and interfere with the primary user. However, a false alarm only affects the secondary user. Similarly, the associated costs should be similarly weighted so as to make sequence detection dependent upon any policy constraints that are set in place to protect primary users.

For example, various wireless standards setting bodies could implement cost constraints for missed detections and false alarms, such as a weighted risk ratio of costs for missed detection to false alarm of 2 to 1, 3 to 1, 4 to 1, 10 to 1, and so forth. The costs can be arbitrarily set to any number greater than 0 based on the policy decision making party, or may be based on tests or learning in the spectrum about the probabilities of a missed detection, $p_m$, and false alarm, $p_f$, occurring. In the extreme cases, if the ratio of the cost of missed detection is much larger than the cost of a false alarm, the sensing system will always declare the primary user in the ON state. On the other hand, if the cost for a false alarm is much larger than the cost of missed detection, the sensing system will always declare the primary user in the OFF state.

Other policy decision making parties may be the Federal Communications Commission, wireless equipment manufacturers, distributors, users, and others. The costs may be implemented in hardware, or software. The costs may be stored either locally or remotely, together with the primary spectrum user parameters, or separately so long as they can be accessed by at least a portion of the wireless access module.

For the forward-backward example above, setting the cost of missed detection $C_{01}$ to 2 and false alarm $C_{10}$ to 1 (when all non-errors cost 0), yields the following minimum sequence:

$$\hat{S}_1 = \operatorname*{argmin}_{k \in \{0,1\}} \sum_{l \in \{0,1\}} C_{kl} \lambda_1(l) =$$
$$\operatorname{argmin}(2*0.1327(k=0), 1*0.8673(k=1)) = 0 (\text{OFF})$$

$$\hat{S}_2 = \operatorname*{argmin}_{k \in \{0,1\}} \sum_{l \in \{0,1\}} C_{kl} \lambda_2(l) =$$
$$\operatorname{argmin}(2*0.1796(k=0), 1*0.8204(k=1)) = 0 (\text{OFF})$$

$$\hat{S}_3 = \operatorname*{argmin}_{k \in \{0,1\}} \sum_{l \in \{0,1\}} C_{kl} \lambda_3(l) =$$
$$\operatorname{argmin}(2*0.6925(k=0), 1*0.3075(k=1)) = 1 (\text{ON})$$

$$\hat{S}_4 = \operatorname*{argmin}_{k \in \{0,1\}} \sum_{l \in \{0,1\}} C_{kl} \lambda_4(l) =$$
$$\operatorname{argmin}(2*0.1796(k=0), 1*0.8204(k=1)) = 0 (\text{OFF})$$

$$\hat{S}_5 = \operatorname*{argmin}_{k \in \{0,1\}} \sum_{l \in \{0,1\}} C_{kl} \lambda_5(l) =$$
$$\operatorname{argmin}(2*0.1327(k=0), 1*0.8673(k=1)) = 0 (\text{OFF})$$

This results in the sequence (OFF,OFF,ON,OFF,OFF), which is the same as the observations. However, setting the cost of missed detection $C_{01}$ to 4.6 and false alarm $C_{10}$ to 1 (when all non-errors cost 0), yields the following minimum sequence:

$$\hat{S}_1 = \operatorname*{argmin}_{k \in \{0,1\}} \sum_{l \in \{0,1\}} C_{kl} \lambda_1(l) =$$
$$\operatorname{argmin}(4.6*0.1327(k=0), 1*0.8673(k=1)) = 0 (\text{OFF})$$

$$\hat{S}_2 = \operatorname*{argmin}_{k \in \{0,1\}} \sum_{l \in \{0,1\}} C_{kl} \lambda_2(l) =$$
$$\operatorname{argmin}(4.6*0.1796(k=0), 1*0.8204(k=1)) = 1 (\text{ON})$$

$$\hat{S}_3 = \operatorname*{argmin}_{k \in \{0,1\}} \sum_{l \in \{0,1\}} C_{kl} \lambda_3(l) =$$
$$\operatorname{argmin}(4.6*0.6925(k=0), 1*0.3075(k=1)) = 1 (\text{ON})$$

$$\hat{S}_4 = \operatorname*{argmin}_{k \in \{0,1\}} \sum_{l \in \{0,1\}} C_{kl} \lambda_4(l) =$$
$$\operatorname{argmin}(4.6*0.1796(k=0), 1*0.8204(k=1)) = 1 (\text{ON})$$

$$\hat{S}_5 = \operatorname*{argmin}_{k \in \{0,1\}} \sum_{l \in \{0,1\}} C_{kl} \lambda_5(l) =$$
$$\operatorname{argmin}(4.6*0.1327(k=0), 1*0.8673(k=1)) = 0 (\text{OFF})$$

This yields the sequence (OFF,ON,ON,ON,OFF), which is a sequence of decisions that is more conservative in favor of reducing missed detections by reporting an ON state for additional time periods.

The cost parameters, together a vector of cost parameters, may be stored in one or more data storage devices accessible by the wireless access module, as disclosed herein.

Complete Forward Only

There are advantages and disadvantages for the wireless access module to perform a complete forward backward analysis to determine the minimal risk sequence. One advantage is that a complete forward and backward pass over the set of observations increases accuracy, and allows for greater exploitation of the hidden Markov model's memory. The advantage of increased accuracy comes at the expense of a longer sensing delay between when the primary user was observed and when sensing and transmission decisions are made by the secondary user. Thus, some embodiments may only implement a portion of the forward-backward analysis.

For example, some embodiments may use Complete Forward (CF) instead of, or in addition to, the full Forward-Backward analysis. The CF is useful when trying to maximize the decision making at the current time instant with minimal delay. When the wireless access module uses this type of sensing, it does not need to calculate any backward probabilities and only needs to store the forward probabilities for the states at the most recent time instant due to the recursive nature of the calculation. The probabilities calculated for the most recent previous time period may become similar to, and used in a similar manner as, the initial probabilities, $\pi_0$ and $\pi_1$, and fed into the calculation for the next time period. Using this information, the CF may use just the current single sensing observation to make a forward only decision and still exploit hidden Markov model memory observed since the wireless access module began functioning, without the need to store all observations. Instead, just the running forward probability is stored between observations to be used as, in essence, the next observation's $\pi_0$ and $\pi_1$ in the calculation above. For a wireless access module using this feature, the backward and posterior probability blocks are not needed.

Complete Forward Partial Backward

Although the CF can make quick decisions without the need to store large amounts of data, the memory in the hidden Markov model is not fully exploited. Instead, another approach that is used in some embodiments is the Complete Forward Partial Backward. Referring to FIG. 5A, arrows 551 and 552 point to the observations that are being used to calculate the forward probabilities. Arrow 553 points to the small subset of observations used to calculate the backwards probabilities, allowing for posterior probabilities to be calculated back three observation time periods.

By including a small portion of the backwards probabilities in the sensing decision, the CFPB allows for additional memory to be exploited resulting in increased accuracy, and still limits the delay in sensing and the amount of observation data that the wireless access module must store. Using CFPB, only the observations that are in the partial backward calculation must be stored. For example, in the embodiments represented by FIG. 5A, only the first three observations must be separately stored. The remaining observations are only needed for the complete forward component, and thus may be summarized by one or more probability pairs similar to $\pi_0$ and $\pi_1$. The amount of time periods to compute the backwards probabilities over can be arbitrarily large, such as 1 period, 2 periods, 3 periods, 4 periods, etc, each with a higher accuracy gain. Surprisingly in fact, under certain circumstances such as those illustrated in 7, a CFPB implementation incorporating two backward time periods may perform nearly as well as a partial or full backwards pass taking into account 10 or 100 backward time periods. However, the accuracy gain by CFPB compared to CF comes at the expense of a slight increase in complexity, sensing delay, and memory usage. Thus, the longer the partial backward window, the more delay, complexity, and memory costs are incurred.

Observation Windows

An observation window is a set of observation data tracked by the wireless access module. An observation window in some embodiments corresponds to the most recent observations that have been taken by a secondary user. The observations in the window have a time order, state, and are usually consecutive. Observation windows may be stored in any storage device, including but not limited to memory, cache, magnetic disk, local or remote storage, a NAS, a SAN, in the cloud, or the like. Any data structure that can store, access, and order the ON/OFF observations may be used to implement the window.

An observation window has a starting observation point and an ending observation point. The starting point corresponds to the oldest observation that is required by the wireless access module to make a sensing decision, whereas the end observation is the most recent observation that was used or will be used to make a sensing decision. An observation window can be arbitrarily large. The longer it is, the more memory can be exploited for sensing, but may increase sensing delay, computation, and complexity.

Turning to FIG. 5B, the set of observations to be used in the forward-backward implementation may be a non-overlapping or overlapping window. 503 illustrates a non-overlapping window. As time progresses, observations are stored in the window. When a sensing decision is made, observations in the window are used for the sensing determination, and then may be discarded or ignored. FIG. 5B shows three possible non-overlapping windows. Non-overlapping window 503 may be discarded after the sensing decision for that window has been made. The next sensing decision will be made after window 505 has received and stored all observations. In some embodiments, partial calculations for the non-overlapping window can be made before all observations are present in the window.

An overlapping window 504 is illustrated by a set of sequential observations shown in FIG. 5B. An overlapping window 504 differs from a non-overlapping window in that in each time period a new observation may be added and old observation removed from the window. In this way, the window is constantly adding recent observations and discarding old ones. After an observation is added, probabilities are calculated and a sensing decision is made on the observations using the techniques shown herein.

An overlapping window need not only add one observation at a time before calculations are made. Some embodiments may add more than one observation before making a new sensing decision. For example, it may add two observations, which would produce a sensing decision every other observation. An overlapping window that adds and removes a number of observations equivalent to its size before a sensing determination is made is equivalent to a non-overlapping window. An overlapping window is sometimes referred to as a sliding window, or overlapping sliding window.

Unlike in energy detection, sequence or state detection takes into account a state change that can occur in the middle of the observation window. Given a large enough observation window, energy detection fails to detect a state change in the middle of a window because it is performing averaging across the entire window. Sequence detection corrects this problem by using a hidden Markov model's memory to predict state changes within an observation window.

Sensing Using Forward-Backward

Figure 6A:
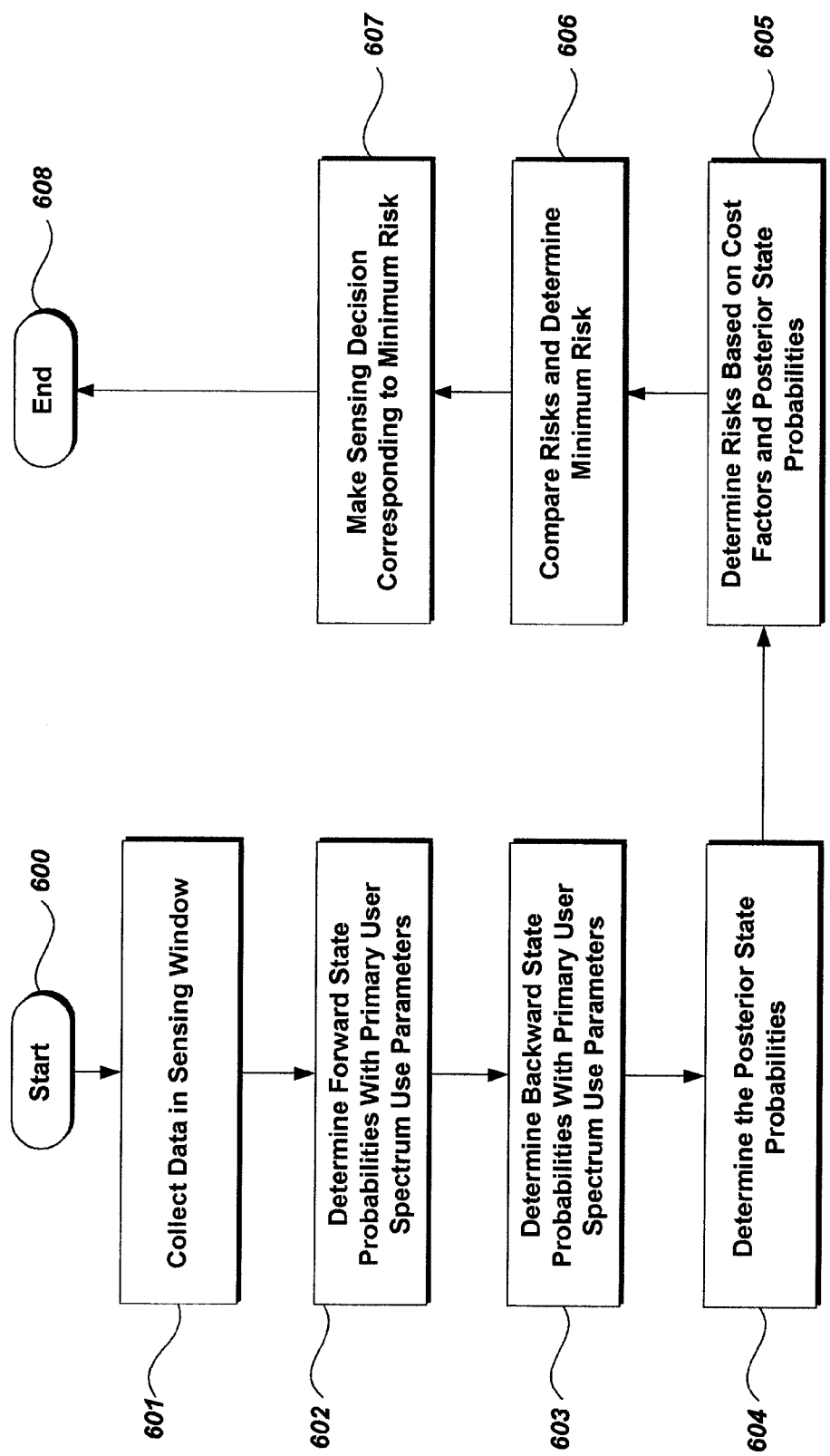
FIG. 6A is a process flow diagram of some embodiments for sensing, sequence, and state detection.

FIG. 6A shows a portion of how one embodiment's wireless access module, or a portion thereof, makes the sensing decision for the secondary user. FIG. 6A depicts the functionality in one cycle of this embodiment. Not depicted in this embodiment is the observation collection from the antenna and related hardware and software, nor any software or hardware making a transmission decision.

The embodiment in FIG. 6A begins with reading in observation data in the sensing window 601. This may be done by accessing any local or remote storage device, or involve accessing memory. Alternatively, some embodiments may already have all the data to be accessed already in a sensing window. The data in the sensing window is used to calculate the minimum risk sequence or states, as depicted herein.

In some embodiments, such as ones using CF or CFPB, the next block is to determine the forward state probabilities 602 as depicted herein based on the observation(s) and the primary user spectrum use parameters. This may result in many calculated probabilities, or one probability as discussed herein depending on the data structure used and the amount of memory to be exploited. For example, for the CF implementation of the wireless access module, only one forward probability need be computed.

In some embodiments, block 603 is for determining the backward state probabilities based on the primary user spectrum use parameters as discussed herein. In some embodiments, such as those embodiments using CF, this block is not necessary.

Some embodiments calculate posterior state probabilities 604 such as those embodiments that use the full Forward-Backward system. The calculation of the posterior probabilities is based on the calculation of forward 602 and backwards 603 probabilities. This block is optional depending on which implementation is used. For example, if using CF, then posterior probabilities and backwards probabilities blocks are not required.

In block 605, the wireless access module determines the risks for a sequence and/or state based on cost factors and posterior state probabilities as discussed herein. The costs may comprise the cost for missed detection and the cost for false alarm, or there may be one equal cost for both. The costs may be coded in hardware or software, and be read from any data storage device. Alternatively, a forward probability can be used instead of the posterior probability if there was no backwards probability calculated for a given time period because the posterior probability would equal the forward probability in this case.

In block 606, the minimum risk may be determined based on all or a subset of the risk calculations performed in block 605.

In block 607 incorporated in some embodiments, the potential sequence and/or state(s) associated with the minimum risk are selected. The selected states and or sequences are then sent to the sensing decision consumer as described herein. Some embodiments may send a single potential primary user state based on the sensing decision corresponding to the best guess of the most current state given the risk analysis and cost factors. Some embodiments may send multiple states, or one or more sequences that correspond to the minimum risk sequence. Some embodiments may send together with the states and/or sequences, or instead of the states and/or sequences, the calculated risks and/or probabilities associated with time periods in the observation window.

Figure 6B:
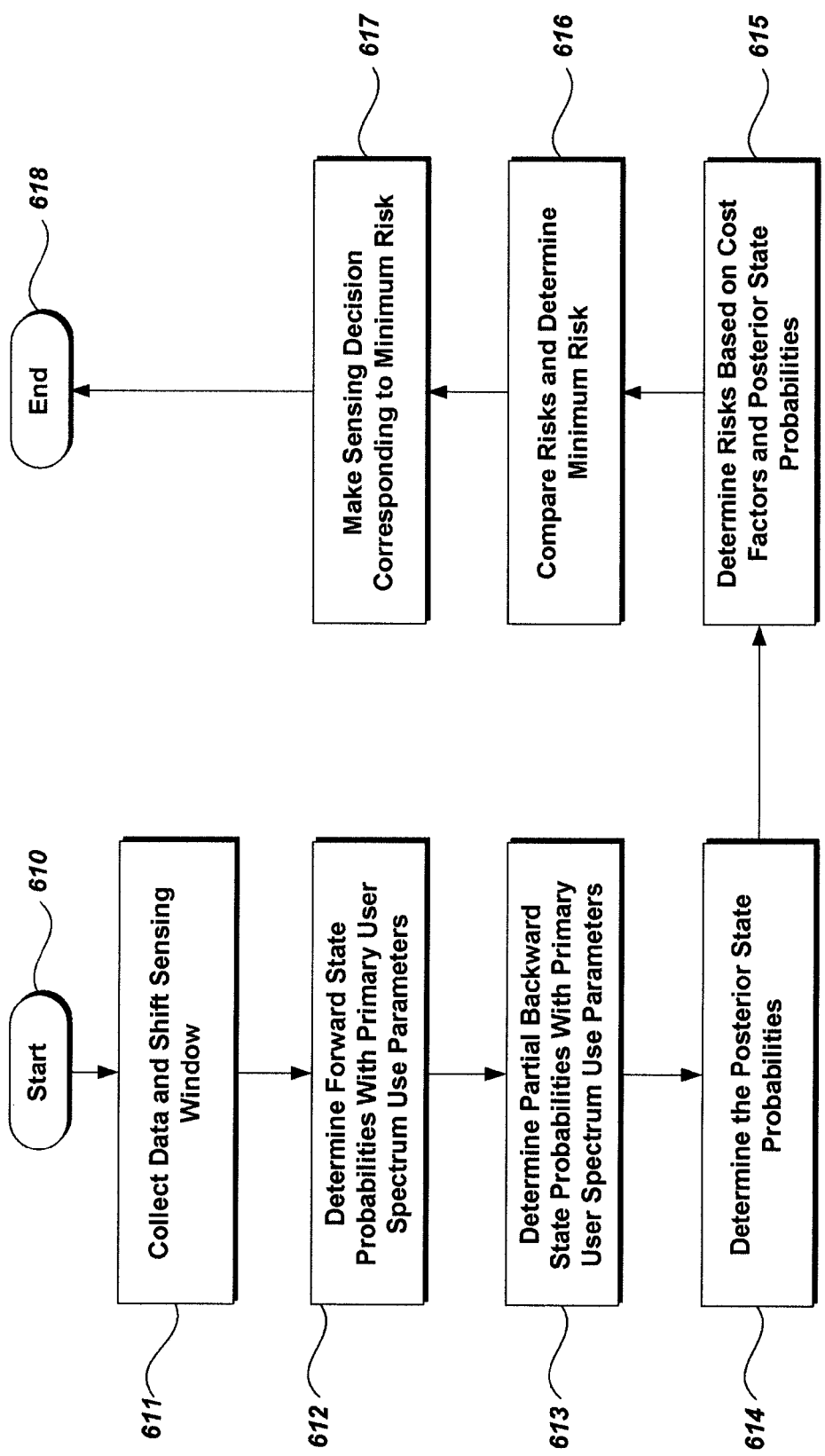
FIG. 6B is a process flow diagram of some embodiments for sensing, sequence, and state detection.

Turning to the portion of the embodiment depicted in FIG. 6B, it differs from FIG. 6A at block 613. In this embodiment, CFPB is used to determine backwards probabilities for only a subset of observations in the observation window, as described herein.

Performance Comparison

The disclosure herein provides for tradeoffs that can be made between sensing accuracy on the one hand and sensing delay, computation, and complexity on the other.

FIG. 7 shows the comparative performance of the various versions of the Forward-Backward implementations. FIG. 7 is a graph showing comparative risk for each implementation at a given signal to noise ratio, when detection is done with a channel OFF/ON dwell time of 200 and 100 observation time periods respectively, and the cost of a missed detection is 10 times the cost of a false alarm. When the signal to noise ratio is low (i.e. the amount of noise and interference is high), the risk for all implementations is high because there is a higher risk of missed detection and false alarm. However, when the signal to noise ratio improves, noticeable differences can be seen between the CF and CFPB implementations. CFPB with only 1 backwards probability calculation performs significantly better than CF at higher SNR. Surprisingly of note, CFPB with only 2 backwards probability calculations performs substantially equally with CFPB with 10 and 100 partial backwards calculations given a large enough SNR. In an embodiment, the system can be configured to between 2 and 5 backwards probability calculations to maintain efficiency and accuracy.

FIG. 8 shows comparative detection probability versus observation window size of sensing schemes described herein against energy detection with non-overlapping and overlapping windows. The graph uses an ON/OFF dwell time of 2000 and 1000 time periods respectively, with an SNR of −10 dB, and a probability of false alarm equal to 0.1. The graph shows that when the sensing window is relatively small, the performances are similar. However, when the length of the sensing window is comparable to the average length of an ON/OFF period, the effect of the state changes in a sensing window can be seen, and the performance of energy detection is seriously affected because it does not take into account state changes within a window. The performance of weighted cost sequence detection however is unaffected because it takes possible state changes into consideration by making sequence decisions and exploiting the memory in the hidden Markov model.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. Thus, it is intended that the scope of the present invention herein disclosed should not be limited by the particular disclosed embodiments described above.

Although the embodiments of the inventions have been disclosed in the context of a certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the embodiments may be made and still fall within one or more of the inventions. Accordingly, it should be understood that various features and aspects of the disclosed embodiments can be combined with or substituted for one another in order to form varying modes of the disclosed inventions. For all of the embodiments described herein the steps of the methods need not be performed sequentially. Thus, it is intended that the scope of the present inventions herein disclosed should not be limited by the particular disclosed embodiments described above.

What is claimed is:

1. A spectrum sensing system, the system comprising:
an antenna configured to receive electromagnetic signals in one or more frequency spectrums;
one or more data storage devices storing an observation window of a plurality of primary user state observations corresponding to a frequency spectrum and one or more primary user spectrum use parameters comprising already determined hidden markov model parameters; and
one or more hardware processors in communication with the antenna and the one or more data storage devices, the one or more hardware processors configured to execute modules comprising at least a sensing module configured to, after having accessed the already determined hidden markov model parameters, periodically cause the one or more hardware processors to perform the following:
receive, via the antenna, one or more primary user observations corresponding to the frequency spectrum;
update the observation window to incorporate the one or more primary user observations into the plurality of primary user state observations, the observation window having a starting observation point and an ending observation point, the ending observation point corresponding to the most recent primary user state observation;
determine one or more forward state probabilities based on the one or more primary user spectrum use parameters and the plurality of primary user state observations in the observation window;
determine one or more backward state probabilities based on the one or more primary user spectrum use parameters and a portion of the plurality of primary user state observations in the observation window, the portion comprising at least the ending point, the portion comprising less primary user state observations than the plurality of primary user state observations;
determine one or more posterior state probabilities for one or more observations in the observation window, wherein the one more posterior state probabilities are based on the one or more forward state probabilities and the one or more backward state probabilities;
determine a risk of a sensing error for each potential primary user state corresponding to an observation period about which a sensing decision is being made based on one or more cost factors and the one or more posterior state probabilities;
select a potential primary user state having a minimum amount of risk of sensing error for each observation corresponding to a time period about which a sensing decision is being made;
send the one or more selected potential primary user states to a sensing decision consumer.

2. The system of claim 1, wherein the cost factors are stored in the one or more data storage devices.

3. The system of claim 1, wherein the one or more data storage devices comprises a first data storage device where the observation window is stored, and a second data storage device where the one or more primary user spectrum use parameters are stored.

4. The system of claim 1, wherein the observation window is a non-overlapping window.

5. The system of claim 1, wherein the observation window is an overlapping window.

6. The system of claim 1, wherein the risk is determined based on two cost factors.

7. The system of claim 6, wherein the two cost factors comprise a first weighted risk of false alarm and a second weighted risk of missed detection.

8. The system of claim 1, wherein the determining of one or more forward state probabilities is further based on a running forward probability.

9. A spectrum sensing system, the system comprising:
an antenna configured to receive electromagnetic signals in one or more frequency spectrums;
one or more data storage devices storing an observation window of a plurality of primary user state observations corresponding to a frequency spectrum and one or more primary user spectrum use parameters comprising already determined hidden markov model parameters; and
one or more hardware processors and in communication with the antenna and the one or more data storage devices, the one or more hardware processors configured to execute modules comprising at least a sensing module configured to, after having accessed the already determined hidden markov model parameters, periodically cause the one or more hardware processors to perform the following:
receive, via the antenna, one or more primary user observations corresponding to the frequency spectrum;
update the observation window to incorporate the one or more primary user observations into the plurality of primary user state observations, the observation window having a starting observation point and an ending observation point, the ending observation point corresponding to the most recent primary user state observation;
determine one or more forward state probabilities based on the one or more primary user spectrum use parameters and the plurality of primary user state observations in the observation window;
determine one or more backward state probabilities based on the one or more primary user spectrum use parameters and a portion of the plurality of primary user state observations in the observation window, the portion comprising at least the ending point, the portion comprising less primary user state observations than the plurality of primary user state observations;
determine one or more posterior state probabilities for one or more observations in the observation window, wherein the one more posterior state probabilities are based on the one or more forward state probabilities and the one or more backward state probabilities;
select a potential primary user state for each observation corresponding to a time period about which a sensing decision is being made based on the one or more posterior state probabilities;
send the one or more selected potential primary user states to a sensing decision consumer.

10. The system of claim 9, wherein the one or more data storage devices comprises a first data storage device where the observation window is stored, and a second data storage device where the one or more primary user spectrum use parameters are stored.

11. The system of claim 9, wherein the observation window is a non-overlapping window.

12. The system of claim 9, wherein the observation window is an overlapping window.

13. The system of claim 9, wherein the selecting of the potential primary user state based on the one or more posterior state probabilities further comprises determining a risk of a sensing error occurring for each potential primary user state based on one or more cost factors and selecting the potential primary user state having a minimum amount of risk of sensing error.

14. The system of claim 13, wherein the risk is determined based on two cost factors.

15. The system of claim 14, wherein the two cost factors comprise a first weighted risk of false alarm and a second weighted risk of missed detection.

16. The system of claim 9, wherein the determining of one or more forward state probabilities is further based on a running forward probability.

17. A computer implemented method of spectrum sensing comprising:
accessing computer-executable instructions from at least one computer-readable storage medium; and
executing, after having accessed one or more primary user spectrum use parameters comprising already determined hidden markov model parameters, the computer-executable instructions, thereby causing computer hardware comprising at least one hardware computer processor to periodically perform operations comprising:
receiving one or more primary user state observations corresponding to a frequency spectrum;
updating an observation window to incorporate the one or more primary user observations, the observation window comprising a plurality of primary user state observations, the observation window having a starting observation point and an ending observation point, the ending observation point corresponding to the most recent primary user state observation;
determining one or more forward state probabilities based on the one or more primary user spectrum use parameters and the plurality of primary user state observations in the observation window;
determining one or more backward state probabilities based on the one or more primary user spectrum use parameters and a portion of the plurality of primary user state observations in the observation window, the portion comprising at least the ending point, the portion comprising less primary user state observations than the plurality of primary user state observations;
determining one or more posterior state probabilities for one or more observations in the observation window, wherein the one more posterior state probabilities are based on the one or more forward state probabilities and the one or more backward state probabilities;
determining a risk of a sensing error for each potential primary user state corresponding to an observation period about which a sensing decision is being made based on one or more cost factors and the one or more posterior state probabilities;
selecting a potential primary user state having a minimum amount of risk of sensing error for each observation corresponding to a time period about which a sensing decision is being made;

sending the one or more selected potential primary user states to a sensing decision consumer.

18. The method of claim 17, wherein the observation window is a non-overlapping window.

19. The method of claim 17, wherein the observation window is an overlapping window.

20. The method of claim 17, wherein the risk is determined based on two cost factors.

21. The method of claim 20, wherein the two cost factors comprise a first weighted risk of false alarm and a second weighted risk of missed detection.

22. The method of claim 17, wherein the determining of one or more forward state probabilities is further based on a running forward probability.

23. A non-transitory storage medium having a computer program stored thereon for causing a suitably programmed system to process computer-program code by performing a method when the computer program is executed on the suitably programmed system, the method comprising:

receiving one or more primary user state observations corresponding to a frequency spectrum;

updating an observation window to incorporate the one or more primary user observations, the observation window comprising a plurality of primary user state observations, the observation window having a starting observation point and an ending observation point, the ending observation point corresponding to the most recent primary user state observation;

determining one or more forward state probabilities based on the one or more primary user spectrum use parameters and the plurality of primary user state observations in the observation window;

determining one or more backward state probabilities based on the one or more primary user spectrum use parameters and a portion of the plurality of primary user state observations in the observation window, the portion comprising at least the ending point, the portion comprising less primary user state observations than the plurality of primary user state observations;

determining one or more posterior state probabilities for one or more observations in the observation window, wherein the one more posterior state probabilities are based on the one or more forward state probabilities and the one or more backward state probabilities;

determining a risk of a sensing error for each potential primary user state corresponding to an observation period about which a sensing decision is being made based on one or more cost factors and the one or more posterior state probabilities;

selecting a potential primary user state having a minimum amount of risk of sensing error for each observation corresponding to a time period about which a sensing decision is being made;

sending the one or more selected potential primary user states to a sensing decision consumer.

24. The non-transitory storage medium of claim 23, wherein the observation window is a non-overlapping window.

25. The non-transitory storage medium of claim 23, wherein the observation window is an overlapping window.

26. The non-transitory storage medium of claim 23, wherein the risk is determined based on at least two cost factors.

27. The non-transitory storage medium of claim 26, wherein the at least two cost factors comprise a first weighted risk of false alarm and a second weighted risk of missed detection.

28. The non-transitory storage medium of claim 23, wherein the determining of one or more forward state probabilities is further based on a running forward probability.

* * * * *